(12) United States Patent
Kobayashi

(10) Patent No.: US 11,214,153 B2
(45) Date of Patent: Jan. 4, 2022

(54) DRIVING SYSTEM

(71) Applicant: DENSO CORPORATION, Kariya (JP)

(72) Inventor: Hisaaki Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/159,688

(22) Filed: Jan. 27, 2021

(65) Prior Publication Data

US 2021/0146788 A1  May 20, 2021

Related U.S. Application Data

(60) Division of application No. 16/396,824, filed on Apr. 29, 2019, now Pat. No. 11,097,624, which is a
(Continued)

(30) Foreign Application Priority Data

Nov. 8, 2016 (JP) .............................. JP2016-217922

(51) Int. Cl.
*B60L 50/50* (2019.01)
*B60L 1/00* (2006.01)
(Continued)

(52) U.S. Cl.
CPC .............. *B60L 50/50* (2019.02); *B60K 6/442* (2013.01); *B60K 6/445* (2013.01); *B60K 6/46* (2013.01);
(Continued)

(58) Field of Classification Search
CPC .... B60L 50/50; B60L 9/18; B60L 7/14; B60L 50/16; B60L 1/00; B60W 20/13;
(Continued)

(56) References Cited

U.S. PATENT DOCUMENTS

2006/0164028 A1   7/2006  Welchko et al.
2013/0328527 A1  12/2013  Kang
(Continued)

FOREIGN PATENT DOCUMENTS

| JP | H07-135797 A   | 5/1995 |
| JP | 2016-063724 A  | 4/2016 |
| JP | 2016-082619 A  | 5/2016 |

OTHER PUBLICATIONS

Aug. 13, 2020 Restriction/Election Issued in U.S. Appl. No. 16/396,824.
Nov. 12, 2020 Office Action Issued in U.S. Appl. No. 16/396,824.

*Primary Examiner* — Toan T Vu
(74) *Attorney, Agent, or Firm* — Oliff PLC

(57) ABSTRACT

A driving system includes a first alternating-current rotary electrical machine and a second alternating-current rotary electrical machine. The driving system includes: a first inverter electrically connected to the first alternating-current rotary electrical machine; a second inverter electrically connected to a first end of each of phase windings constituting the second alternating-current rotary electrical machine; a step-up converter; and a third inverter that is electrically connected to a second end of each of the phase windings and transfers power to a second direct-current power source different from the first direct-current power source to drive the second alternating-current rotary electrical machine. The step-up converter raises an output voltage of the first direct-current power source and outputs the output voltage to the first inverter and the second inverter. The second direct-current power source and the first alternating-current rotary electrical machine are connected by a single connection route.

7 Claims, 18 Drawing Sheets

Related U.S. Application Data continuation of application No. PCT/JP2017/037067, filed on Oct. 12, 2017.

(51) Int. Cl.

| | | |
|---|---|---|
| *B60L 7/14* | (2006.01) | |
| *B60W 10/06* | (2006.01) | |
| *B60W 20/13* | (2016.01) | |
| *H02M 3/158* | (2006.01) | |
| *H02M 7/48* | (2007.01) | |
| *H02J 7/14* | (2006.01) | |
| *H02J 3/38* | (2006.01) | |
| *H02K 47/02* | (2006.01) | |
| *B60L 9/18* | (2006.01) | |
| *H02M 3/155* | (2006.01) | |
| *B60K 6/46* | (2007.10) | |
| *B60K 6/52* | (2007.10) | |
| *B60W 10/26* | (2006.01) | |
| *B60K 6/445* | (2007.10) | |
| *B60W 10/08* | (2006.01) | |
| *B60K 6/442* | (2007.10) | |
| *H02M 7/5387* | (2007.01) | |
| *B60L 50/16* | (2019.01) | |
| *H02M 7/04* | (2006.01) | |
| *H02M 11/00* | (2006.01) | |
| *H02M 3/335* | (2006.01) | |
| *H02M 1/00* | (2006.01) | |

(52) U.S. Cl.
CPC ............... *B60K 6/52* (2013.01); *B60L 1/00* (2013.01); *B60L 7/14* (2013.01); *B60L 9/18* (2013.01); *B60L 50/16* (2019.02); *B60W 10/06* (2013.01); *B60W 10/08* (2013.01); *B60W 10/26* (2013.01); *B60W 20/13* (2016.01); *H02J 3/38* (2013.01); *H02J 7/1423* (2013.01); *H02K 47/02* (2013.01); *H02M 3/155* (2013.01); *H02M 3/158* (2013.01); *H02M 7/04* (2013.01); *H02M 7/48* (2013.01); *H02M 7/53875* (2013.01); *H02M 11/00* (2013.01); *H02M 1/0003* (2021.05); *H02M 1/007* (2021.05); *H02M 1/008* (2021.05); *H02M 1/009* (2021.05); *H02M 1/0048* (2021.05); *H02M 3/33584* (2013.01); *Y02T 10/62* (2013.01); *Y02T 10/70* (2013.01); *Y02T 10/7072* (2013.01); *Y02T 10/72* (2013.01); *Y02T 10/92* (2013.01)

(58) Field of Classification Search
CPC ...... B60W 10/06; B60W 10/26; B60W 10/08; H02M 3/158; H02M 7/53875; H02M 7/04; H02M 11/00; H02M 1/0003; H02M 1/007; H02M 1/008; H02M 1/009; H02M 1/0048; H02M 3/33584; H02M 3/155; H02M 7/48; B60K 6/442; B60K 6/46; B60K 6/52; B60K 6/445; H02J 3/38; H02J 7/1423; H02K 47/02; Y02T 10/62; Y02T 10/70; Y02T 10/72; Y02T 10/7072; Y02T 10/92

See application file for complete search history.

(56) References Cited

U.S. PATENT DOCUMENTS

2014/0265942 A1* 9/2014 Li ........................ H02P 5/74
318/51

2019/0252994 A1    8/2019 Kobayashi

* cited by examiner

| VOLTAGE VECTOR | U PHASE | V PHASE | W PHASE |
|---|---|---|---|
| V0 | 0 | 0 | 0 |
| V1 | 1 | 0 | 0 |
| V2 | 1 | 1 | 0 |
| V3 | 0 | 1 | 0 |
| V4 | 0 | 1 | 1 |
| V5 | 0 | 0 | 1 |
| V6 | 1 | 0 | 1 |
| V7 | 1 | 1 | 1 |

0 : LOWER ARM SWITCH ON
1 : UPPER ARM SWITCH ON

RELATED TECHNIQUE

DRIVING SYSTEM

CROSS REFERENCE TO RELATED APPLICATIONS

This is a Divisional Application of U.S. patent application Ser. No. 16/396,824 filed Apr. 29, 2019, which in turn claims the benefit under 35 U.S.C. from International Application No. PCT/JP2017/037067 filed on Oct. 12, 2017, the entire contents of which are incorporated herein by reference. This application is also based on and claims the benefit of priority from Japanese Patent Application No. 2016-217922 filed on Nov. 8, 2016, the entire contents of which are incorporated herein by reference.

BACKGROUND

Technical Field

The present disclosure relates to a driving system.

Background Art

As this type of a driving system, for example, there is known a driving system that includes an alternating-current rotary electrical machine with open-delta armature windings. In this driving system, a first direct-current power source is connected via a first inverter to a first end of both ends of each of phase windings constituting the alternating-current rotary electrical machine. In addition, a second direct-current power source different from the first direct-current power source is connected via a second inverter to a second end of the both ends of each of the phase windings constituting the alternating-current rotary electrical machine.

SUMMARY

In the present disclosure, provided is a driving system as the following. The driving system includes: a first inverter; a second inverter; a step-up converter that raises an output voltage of the first direct-current power source and outputs the output voltage to the first inverter and the second inverter; and a third inverter, wherein the second direct-current power source and the first alternating-current rotary electrical machine are connected by a single connection route.

BRIEF DESCRIPTION OF THE DRAWINGS

The foregoing and other objects, features, and advantages of the present disclosure will be more clarified by the following detailed descriptions with reference to the accompanying drawings.

The drawings are as follows.

DETAILED DESCRIPTION OF THE PREFERRED EMBODIMENTS

Figure 1:
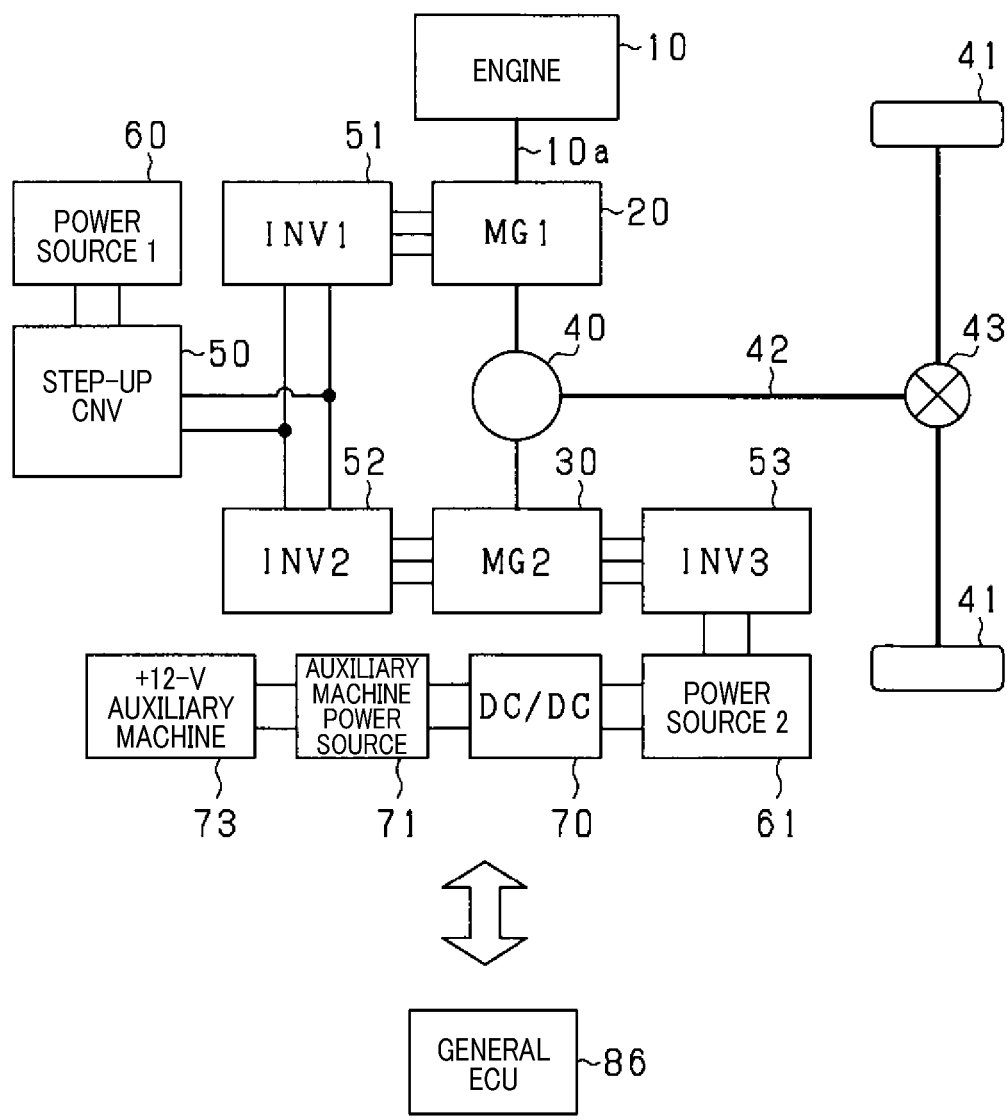
FIG. 1 is an overall configuration diagram of an in-vehicle driving system according to a first embodiment.

The inventor of the present disclosure has studied a driving system which prevents deterioration in controllability of the control amounts of first and second alternating-current rotary electrical machines and in which loss is reduced based on following investigation.

As this type of a driving system, for example, there is known a driving system that includes an alternating-current rotary electrical machine with open-delta armature windings. In this driving system, a first direct-current power source is connected via a first inverter to a first end of both ends of each of phase windings constituting the alternating-current rotary electrical machine. In addition, a second direct-current power source different from the first direct-current power source is connected via a second inverter to a second end of the both ends of each of the phase windings constituting the alternating-current rotary electrical machine. According to the driving system that supplies power from the two direct-current power sources to the alternating-current rotary electrical machine, it is possible to supply a large amount of power to the alternating-current rotary electrical machine.

There is also a driving system in which another alternating-current rotary electrical machine is included the driving system described above. This driving system includes a first alternating-current rotary electrical machine, a second alternating-current rotary electrical machine, first to third inverters, and a fourth inverter.

More specifically, a first direct-current power source is connected via the first inverter to a first end of both ends of each of phase windings constituting the first alternating-current rotary electrical machine, and the first direct-current power source is connected via the second inverter to a first end of both ends of each of phase windings constituting the second alternating-current rotary electrical machine.

On the other hand, a second direct-current power source different from the first direct-current power source is connected via the third inverter to a second end of the both ends of each of the phase windings constituting the second alternating-current rotary electrical machine, and the second direct-current power source is connected via the fourth inverter to a second end of the both ends of each of the phase windings constituting the first alternating-current rotary electrical machine.

When power generated by one of the first and second alternating-current rotary electrical machines is supplied to the other rotary electrical machine, the potential difference in an electrical path connecting between the first alternating-current rotary electrical machine and the second alternating-current rotary electrical machine may become large. In this case, there is a risk of large current flow in the electrical path that would lead to increase in loss resulting from current flow into the electrical path.

In addition, there may occur circulating current in the driving system including the first and second alternating-current rotary electrical machines. The circulating current refers to the flow of current into a closed circuit including the first to fourth inverters and the phase windings of the first and second alternating-current rotary electrical machines. For example, the circulating current may occur when power generated by the first and second alternating-current rotary electrical machines are supplied to the first direct-current power source to charge the first direct-current power source. Specifically, when the power generation voltage of the second alternating-current rotary electrical machine is lower than the power generation voltage of the first alternating-current rotary electrical machine, for example, the output current of the first alternating-current rotary electrical machine may not flow into the first direct-current power source but may flow into the closed circuit depending on the control states of the first to fourth inverters. In the event of such circulating current, the controllability of the control amounts of the first and second alternating-current rotary electrical machines may be deteriorated.

the present disclosure provides a driving system that prevents deterioration in controllability of the control amounts of first and second alternating-current rotary electrical machines, in which loss is reduced.

First Embodiment

Hereinafter, a first embodiment in which a driving system according to the present disclosure is applied to a hybrid vehicle including an engine and rotary electrical machines as a running power source will be described with reference to the drawings.

As illustrated in FIG. 1, the vehicle includes an engine 10, a first motor generator 20, a second motor generator 30, and a planetary gear mechanism 40. In the present embodiment, the first motor generator 20 and the second motor generator 30 are three-phase alternating-current rotary electrical machines, more specifically, permanent magnet synchronous rotary machines.

The second motor generator 30 constitutes a running power source of the vehicle together with the engine 10 and has a power generation function by regenerative driving control. The first motor generator 20 acts as a power generator with the engine 10 as a motive power source and acts as a motor that provides initial rotation of an output shaft 10a of the engine 10 at starting of the engine 10.

The planetary gear mechanism 40 is a member that allows power transmission among the engine 10, the first motor generator 20, the second motor generator 30, and driving wheels 41. The planetary gear mechanism 40 includes a ring gear, a sun gear, a planetary carrier, and a plurality of pinion gears that allows power transmission between the sun gear and the ring gear. The output shaft 10a of the engine 10 is mechanically connected to a rotation shaft of the planetary carrier, and a drive shaft 42 and a rotation shaft of a rotor of the second motor generator 30 are mechanically connected to a rotation shaft of the ring gear. The drive shaft 42 is coupled to the driving wheels 41 via a differential gear 43. A rotation shaft of a rotor of the first motor generator 20 is mechanically connected to a rotation shaft of the sun gear. The rotation speeds of the sun gear, the carrier, and the ring gear are linearly aligned in this order on a nomographic chart.

When the first motor generator 20 acts as a power generator, the motive power input from the output shaft 10a of the engine 10 to the carrier is divided and input to the sun gear and the ring gear, and the motive power input to the sun gear constitutes a drive source of the first motor generator 20. On the other hand, when the first motor generator 20 acts as a motor, the motive power input from the first motor generator 20 to the sun gear is input to the output shaft 10a of the engine 10 via the carrier to provide initial rotation of the output shaft 10a.

The vehicle includes a step-up converter 50, a first inverter 51, a second inverter 52, and a third inverter 53. In the present embodiment, the first inverter 51, the second inverter 52, and the third inverter 53 are three-phase inverters.

The vehicle includes a first power source 60 and a second power source 61. In the present embodiment, the first power source 60 and the second power source 61 can be secondary batteries, specifically, lithium-ion storage batteries or nickel-hydride storage batteries, for example. In the present embodiment, a rated voltage Vmax2 (for example, 200V) of the second power source 61 is set to be lower than a rated voltage Vmax1 (for example, 300V) of the first power source 60. In the present embodiment, maximum output power Wmax2 of the second power source 61 is set to be larger than maximum output power Wmax1 of the first power source 60. Although not illustrated in FIG. 1, a relay is provided between the second power source 61 and the third inverter 53.

The step-up converter 50 has the function to raise the output voltage of the first power source 60 and output the output voltage to the first inverter 51 and the second inverter 52. The step-up converter 50 lowers the direct-current voltage output from at least one of the first inverter 51 and the second inverter 52 and supplies the direct-current voltage to the first power source 60 to charge the first power source 60.

The vehicle includes a DCDC converter 70, an auxiliary machine power source 71, and an auxiliary machine 72. The DCDC converter 70 lowers the output voltage of the second power source 61 and supplies the output voltage to the auxiliary machine power source 71 to charge the auxiliary machine power source 71. The auxiliary machine power source 71 constitutes a power supply source of the auxiliary machine 72. In the present embodiment, the auxiliary machine power source 71 is a secondary battery lower in rated voltage than the first power source 60 and the second power source 61, specifically, a lead storage battery with a rated voltage of 12V. Accordingly, the auxiliary machine 72 has a rated voltage of 12V.

Subsequently, an electrical configuration of an in-vehicle driving system will be described with reference to FIG. 2.

The step-up converter 50 includes a reactor 50a, a first capacitor 50b, a second capacitor 50c, and a serial connection body of upper and lower arm step-up switches Scp and Scn. In the present embodiment, the step-up switches Scp and Scn are voltage-controlled semiconductor switching elements, more specifically, IGBTs. Accordingly, high-potential side terminals of the step-up switches Scp and Scn are collectors, and low-potential side terminals of the same are emitters. Free wheel diodes Dcp and Dcn are connected in antiparallel to the step-up switches Scp and Scn.

A first power source-side terminal Cb1 of the step-up converter 50 is connected to a first end of the reactor 50a, and the emitter of the upper arm step-up switch Scp and the collector of the lower arm step-up switch Scn are connected to a second end of the reactor 50a. A second power source-side terminal Cb2 of the step-up converter 50 is connected to the emitter of the lower arm step-up switch Scn. The first power source-side terminal Cb1 and the second power source-side terminal Cb2 are connected together by the first capacitor 50b. A positive terminal of the first power source 60 is connected to the first power source-side terminal Cb1, and a negative terminal of the first power source 60 is connected to the second power source-side terminal Cb2. In the present embodiment, the first power source-side terminal Cb1 and the second power source-side terminal Cb2 are equivalent to a "power source-side connection unit".

A first inverter-side terminal Ci1 of the step-up converter 50 is connected to the collector of the upper arm step-up switch Scp, and a second inverter-side terminal Ci2 of the step-up converter 50 is connected to the emitter of the lower arm step-up switch Scn. The first invertor-side terminal Ci1 and the second inverter-side terminal Ci2 are connected together by the second capacitor 50c. In the present embodiment, the first inverter-side terminal Ci1 and the second inverter-side terminal Ci2 are equivalent to an "inverter-side connection unit".

The first inverter 51 includes serial connection bodies of upper arm first switches S1p and lower arm first switches S1n corresponding to U, V, and W phases. In the present embodiment, the first switches S1p and S1n are voltage-controlled semiconductor switching elements, specifically, IGBTs. Free wheel diodes D1p and D1n are connected in antiparallel to the first switches S1p and S1n.

A first end of a U-phase winding 20U of the first motor generator 20 is connected to a connection point of the U-phase upper and lower arm first switches S1p and S1n. A first end of a V-phase winding 20V of the first motor generator 20 is connected to a connection point of the V-phase upper and lower arm first switches S1p and S1n. A first end of a W-phase winding 20W of the first motor generator 20 is connected to a connection point of the W-phase upper and lower arm first switches S1p and S1n. Second ends of the U, V, and W-phase windings 20U, 20V, and 20W are connected at a neutral point. In the present embodiment, the U, V, and W-phase windings 20U, 20V, and 20W are shifted in phase from each other by an electrical angle of 120 degrees.

Collectors of the upper arm first switches S1p are connected to a first high-potential side terminal CH1 as a terminal of the first inverter 51. The first inverter-side terminal Ci1 of the step-up converter 50 is connected to the first high-potential side terminal CH1 via a first high-potential electrical path LH1. Emitters of the lower arm first switches S1n are connected to the first low-potential side terminal CL1 as a terminal of the first inverter 51. The second inverter-side terminal Ci2 of the step-up converter 50 is connected to the first low-potential side terminal CL1 via a first low-potential electrical path LL1.

The second inverter 52 includes serial connection bodies of upper arm second switches S2p and lower arm second switches S2n corresponding to the U, V, and W phases. In the present embodiment, the second switches S2p and S2n are voltage-controlled semiconductor switching elements, specifically, IGBTs. Free wheel diodes D2p and D2n are connected in antiparallel to the second switches S2p and S2n.

Collectors of the upper arm second switches S2p are connected to a second high-potential side terminal CH2 as a terminal of the second inverter 52. The first inverter-side terminal Ci1 is connected to the second high-potential side terminal CH2 via a second high-potential electrical path LH2. Emitters of the lower arm second switches Stn are connected to a second low-potential side terminal CL2 as a terminal of the second inverter 52. The second inverter-side terminal Ci2 is connected to the second low-potential side terminal CL2 via a second low-potential electrical path LL2.

A first end of a U-phase winding 30U of the second motor generator 30 is connected to a connection point of the U-phase upper and lower arm second switches S2p and S2n. A first end of a V-phase winding 30V of the second motor generator 30 is connected to a contact point of the V-phase upper and lower arm second switches S2p and S2n. A first end of a W-phase winding 30W of the second motor generator 30 is connected to a contact point of the W-phase upper and lower arm second switches S2p and S2n. In the present embodiment, the U, V, and W-phase windings 30U, 30V, and 30W are shifted in phase from each other by an electrical angle of 120 degrees.

The third inverter 53 includes serial connection bodies of upper arm third switches S3p and lower arm third switches S3n corresponding to the U, V, and W phases. In the present embodiment, the third switches S3p and S3n are voltage-controlled semiconductor switching elements, specifically, IGBTs. Free wheel diodes D3p and D3n are connected in antiparallel to the third switches S3p and S3n.

A second end of the U-phase winding 30U is connected to a connection point of the U-phase upper and lower arm second switches S3p and S3n. A second end of the V-phase winding 30V is connected to a contact point of the V-phase upper and lower arm third switches S3p and S3n. A second end of the W-phase winding 30W is connected to a contact point of the W-phase upper and lower arm third switches S3p and S3n.

Collectors of the upper arm third switches S3p are connected to a third high-potential side terminal CH3 as a terminal of the third inverter 53. A positive terminal of the second power source 61 is connected to the third high-potential side terminal CH3 via a first relay 54a. Emitters of the lower arm third switches S3n are connected to a third low-potential side terminal CL3 as a terminal of the third inverter 53. A negative terminal of the second power source 61 is connected to the third low-potential side terminal CL3 via a second relay 54b. The first relay 54a and the second relay 54b can be normally-open relays, for example. The third high-potential side terminal CH3 and the third low-potential side terminal CL3 are connected together by a third capacitor 55. In the present embodiment, an electrical path that connects the third high-potential side terminal CL3 and the positive terminal of the second power source 61 and includes the first relay 54a is equivalent to a "high-voltage side connection path". In addition, an electrical path that connects the third low-potential side terminal CL3 and the negative terminal of the second power source 61 and includes the second relay 54b is equivalent to a "low-voltage side connection path". In the present embodiment, the relays 54a and 54b are equivalent to a "switch portion".

Figure 3:
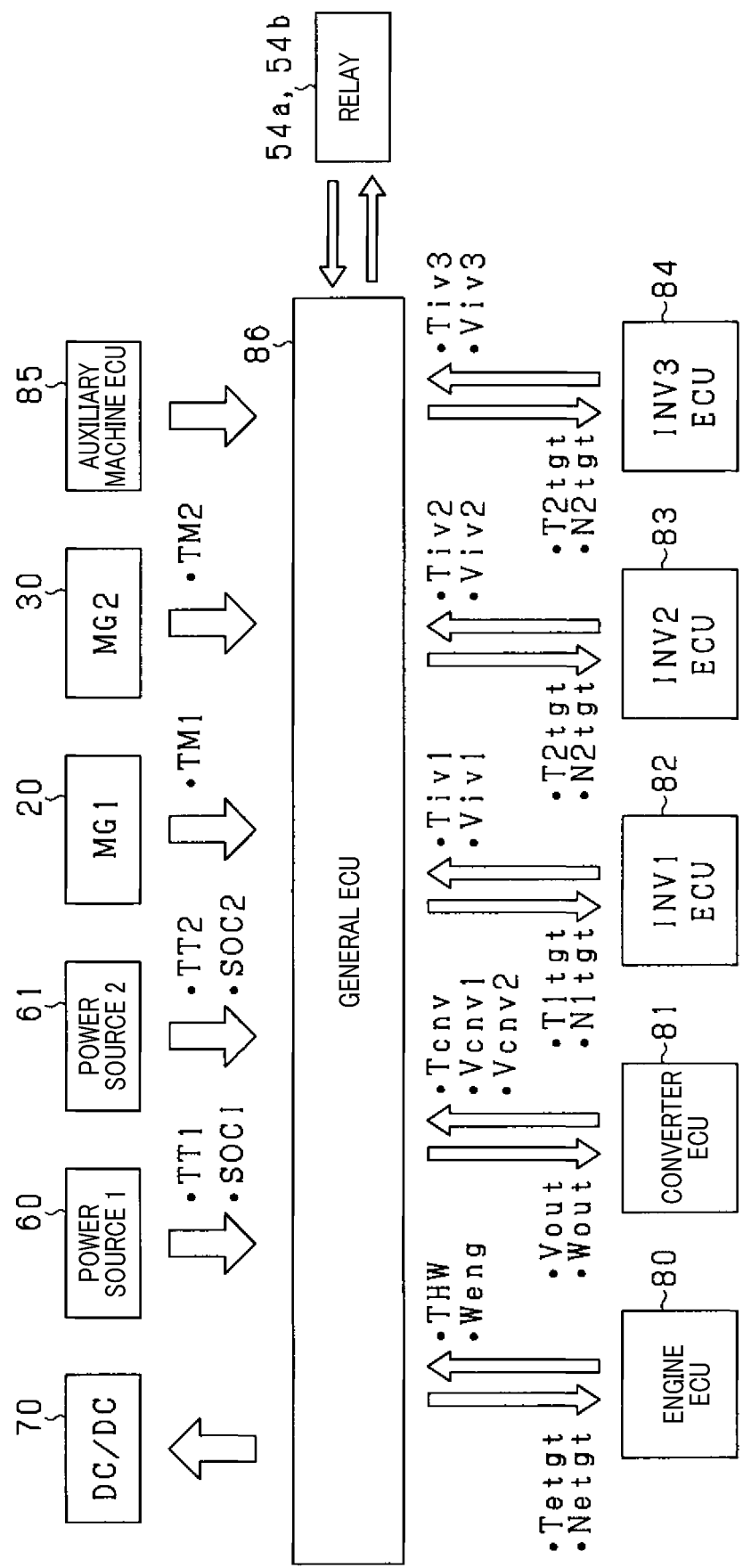
FIG. 3 is a diagram illustrating ECUs.

Subsequently, each of control devices mounted in the vehicle will be described with reference to FIG. 3.

The vehicle includes an engine ECU 80 for controlling the engine 10, a converter ECU 81 for controlling the step-up converter 50, a first inverter ECU 82 for controlling the first inverter 51, a second inverter ECU 83 for controlling the second inverter 52, a third inverter ECU 84 for controlling the third inverter 53, and an auxiliary machine ECU 85 for controlling the auxiliary machine 72.

The vehicle includes a general ECU 86 as a higher-order control device for the ECUs 80 to 85. In the present embodiment, the general ECU 86 includes a "regeneration control unit". The general ECU 86 acquires information including a cooling water temperature THW of the engine 10 and a current output Weng of the engine 10 from the engine ECU 80. Based on the acquired information, the general ECU 86 outputs information including a torque instructed value Tetgt of the engine 10 and a rotation speed instructed value Netgt of the engine 10 to the engine ECU 80. Based on the information acquired from the general ECU 86, the engine ECU 80 performs combustion control of the engine 10 to control the actual torque of the engine 10 to the torque instructed value Tetgt and control the actual rotation speed of the engine 10 to the rotation speed instructed value Netgt.

The general ECU 86 acquires information including a temperature Tcnv of the step-up converter 50, a first converter voltage Vcnv1 as a terminal voltage of the first capacitor 50b, and a second converter voltage Vcnv2 as a terminal voltage of the second capacitor 50c from the converter ECU 81. In this case, the temperature of the step-up converter 50 refers to the temperature of the step-up switches Scp and Scn, for example. Based on the acquired information, the general ECU 86 outputs information including an instructed output voltage Vout and an instructed output power Wout of the step-up converter 50 to the converter ECU 81. In the case of causing the step-up converter 50 to perform a step-up action, the converter ECU 81 performs on-off control of the lower arm step-up switch Scn to control the second converter voltage Vcnv2 to the instructed output voltage Vout and perform feedback control of output power from the first and second inverter-side terminals Ci1 and Ci2 to the instructed output power Wout. In the present embodiment, during the step-up action, the upper arm step-up switch Scp remains off.

On the other hand, in the case of causing the step-up converter 50 to perform a step-down action, the converter ECU 81 performs on-off control of the upper arm step-up switch Scp to control the first converter voltage Vcnv1 to the instructed output voltage Vout and perform feedback control of the output power from the first and second power source-side terminals Cb1 and Cb1 to the instructed output power Wout. In the present embodiment, during the step-down action, the lower arm step-up switch Scn remains off.

The general ECU 86 acquires information including a temperature detection value TT1 of a first temperature detection unit configured to detect the temperature of the first power source 60, a charging rate SOC1 of the first power source 60, a temperature detection value TT2 of a second temperature detection unit configured to detect the temperature of the second power source 61, and a charging rate SOC2 of the second power source 61.

The general ECU 86 performs on-off controls of the first relay 54a and the second relay 54b.

The general ECU 86 acquires a temperature TM1 of the first motor generator 20 and a temperature TM2 of the second motor generator 30. The general ECU 86 acquires a temperature Tiv1 of the first inverter 51 and a first power source voltage Viv1 as a potential difference between the first high- and low-potential side terminals CH1 and CL1 from the first inverter ECU 82, and acquires a temperature Tiv2 of the second inverter 52 and a second power source voltage Viv2 as a potential difference between the second high- and low-potential side terminals CH2 and CL2 from the second inverter ECU 83. The general ECU 86 acquires a temperature Tiv3 of the third inverter 53 and a third power source voltage Viv3 as a potential difference between the third high- and low-potential side terminals CH3 and CL3 from the third inverter ECU 84.

Based on the various kinds of acquired information, the general ECU 86 outputs information including a torque instructed value T1tgt of the first motor generator 20 and a rotation speed instructed value N1tgt of the first motor generator 20 to the first inverter ECU 82. Based on the information acquired from the general ECU 86, the first inverter ECU 82 controls the switches S1p and S1n constituting the first inverter 51 to control the actual torque of the first motor generator 20 to the torque instructed value Mgt and control the actual rotation speed of the first motor generator 20 to the rotation speed instructed value N1tgt. Accordingly, in the present embodiment, sinusoidal phase currents shifted in phase by an electrical angle of 120 degrees are flown to the phase windings 20U, 20V, and 20W of the first motor generator 20.

Based on the various kinds of acquired information, the general ECU 86 outputs information including a torque instructed value T2tgt of the second motor generator 30 and a rotation speed instructed value N2tgt of the second motor generator 30 to the second and third inverter ECUs 83 and 84. Based on the information acquired from the general ECU 86, the second and third inverter ECUs 83 and 84 control the switches S2p, Stn, S3p, and S3n constituting the second and third inverters 52 and 53 to control the actual torque of the second motor generator 30 to the torque instructed value T2tgt and control the actual rotation speed of the second motor generator 30 to the rotation speed instructed value N2tgt. Accordingly, in the present embodiment, sinusoidal phase currents shifted in phase by an electrical angle of 120 degrees are flown to the phase windings 30U, 30V, and 30W of the second motor generator 30.

Figures 4, 5:
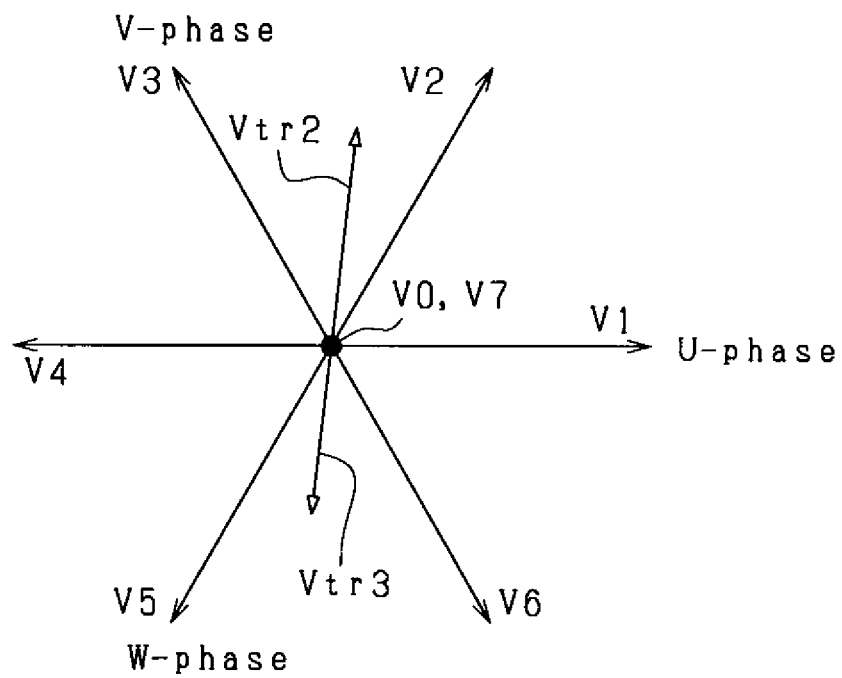
FIG. 4 is a diagram illustrating a method for controlling second and third inverters.
FIG. 5 is a diagram illustrating relationships between voltage vectors and switch driving states.

In the present embodiment, the second inverter ECU 83 and the third inverter ECU 84 control the switches S2p, Stn, S3p, and S3n constituting the second and third inverters 52 and 53 such that the phase of the second output voltage vector Vtr2 as an output voltage vector of the second inverter 52 and the phase of the third output voltage vector Vtr3 as an output voltage vector of the third inverter 53 are different from each other by an electrical angle of 180 degrees as illustrated in FIG. 4. This increases the voltage to be applied to the phase windings of the second motor generator 30 and increases the output torque of the second motor generator 30. FIG. 5 illustrates driving modes of the upper and lower arm switches corresponding to effective voltage vectors V1 to V6 and reactive voltage vectors V0 and V7.

Subsequently, an advantageous effect of the present embodiment will be described.

Figure 6:
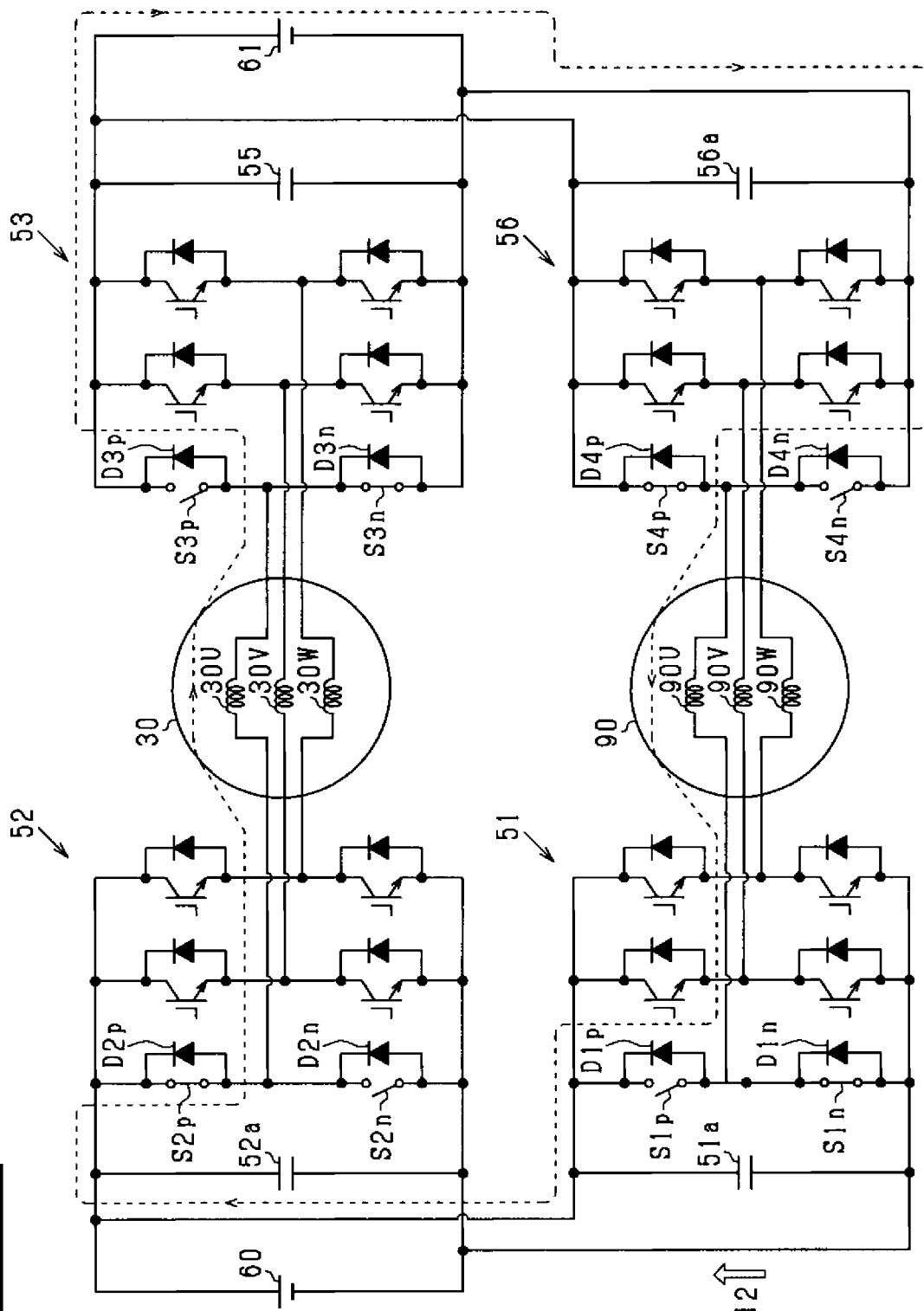
FIG. 6 is a diagram illustrating the occurrence of circulating current according to a related technique.

According to the present embodiment, it is possible to exhibit the advantageous effect that, without the occurrence of circulating current, it is possible to prevent reduction in the controllability of the torques and rotation speeds of the first motor generator 20 and the second motor generator 30. Hereinafter, this advantageous effect will be described in comparison with a related technique. FIG. 6 illustrates the related technique. For the sake of convenience, in FIG. 6, the same components as those illustrated in FIG. 2 are given the same reference numerals as those in FIG. 2.

As illustrated in FIG. 6, the vehicle includes a first motor generator 90 and a fourth inverter 56. The first motor generator 90 is configured in the same manner as the second motor generator 30, and the fourth inverter 56 is configured in the same manner as the third inverter 53.

A first end of a U-phase winding 90U of the first motor generator 90 is connected to a connection point of U-phase upper and lower first switches S1p and S1n. A first end of a V-phase winding 90V of the first motor generator 90 is connected to a connection point of V-phase upper and lower arm first switches S1p and S1n. A first end of a W-phase winding 90W of the first motor generator 90 is connected to a connection point of W-phase upper and lower arm first switches S1p and S1n.

A connection point of U-phase upper and lower arm fourth switches S4p and S4n constituting the fourth inverter 56 is connected to a second end of the U-phase winding 90U. A connection point of V-phase upper and lower arm fourth switches S4p and S4n constituting the fourth inverter 56 is connected to a second end of the V-phase winding 90V. A connection point of W-phase upper and lower arm fourth switches S4p and S4n constituting the fourth inverter 56 is connected to a second end of the W-phase winding 90W. Free wheel diodes D4p and D4n are connected in antiparallel to the fourth switches S4p and S4n.

A collector of the upper arm fourth switch S4p and an emitter of the lower arm fourth switch S4n are connected together by a fourth capacitor 56a. The positive terminal of the second power source 61 is connected to the collectors of the upper arm fourth switch S4p, and the negative terminal of the second power source 61 is connected to the emitters of the lower arm fourth switch S4n.

In the related technique, the switches S1p, S1n, S4p, and S4n constituting the first and fourth inverters 51 and 56 are controlled such that the phase of a first output voltage vector as an output voltage vector of the first inverter 51 and the phase of a fourth output voltage vector as an output voltage vector of the fourth inverter 56 are different from each other by an electrical angle of 180 degrees.

In the related technique, circulating current may occur. The circulating current refers to the flow of electrical current to a closed circuit including the windings of the first motor generator 90, the first inverter 51, the windings of the second motor generator 30, the third inverter 53, and the fourth inverter 56. Hereinafter, the circulating current will be described taking the U phase as an example with reference to FIG. 6.

FIG. 6 illustrates an example of a case in which respective generated regenerative power of the first motor generator 90 and the second motor generator 30 is supplied to the first power source 60 to charge the first power source 60. In the case of FIG. 6, the regenerative power generation voltage (for example, 50V) of the first motor generator 90 is lower than the regenerative power generation voltage (for example, 100V) of the second motor generator 30.

In the example of FIG. 6, the phase of the second output voltage vector Vtr2 and the phase of the third output voltage vector Vtr3 are different by 180 degrees. Accordingly, as illustrated by broken lines in FIG. 6, there occurs circulating current in the U phase such that electric current flows into the closed circuit including the upper arm second switch S2p, the U-phase winding 30U, the free wheel diode D3p of the third inverter 53, the second power source 61, the free wheel diode D4n of the fourth inverter 56, the U-phase winding 90U, and the free wheel diode D1p of the first inverter 51. In this case, the controllability of torque and rotation speed of the first motor generator 90 and the second motor generator 30 become deteriorated.

Figure 2:
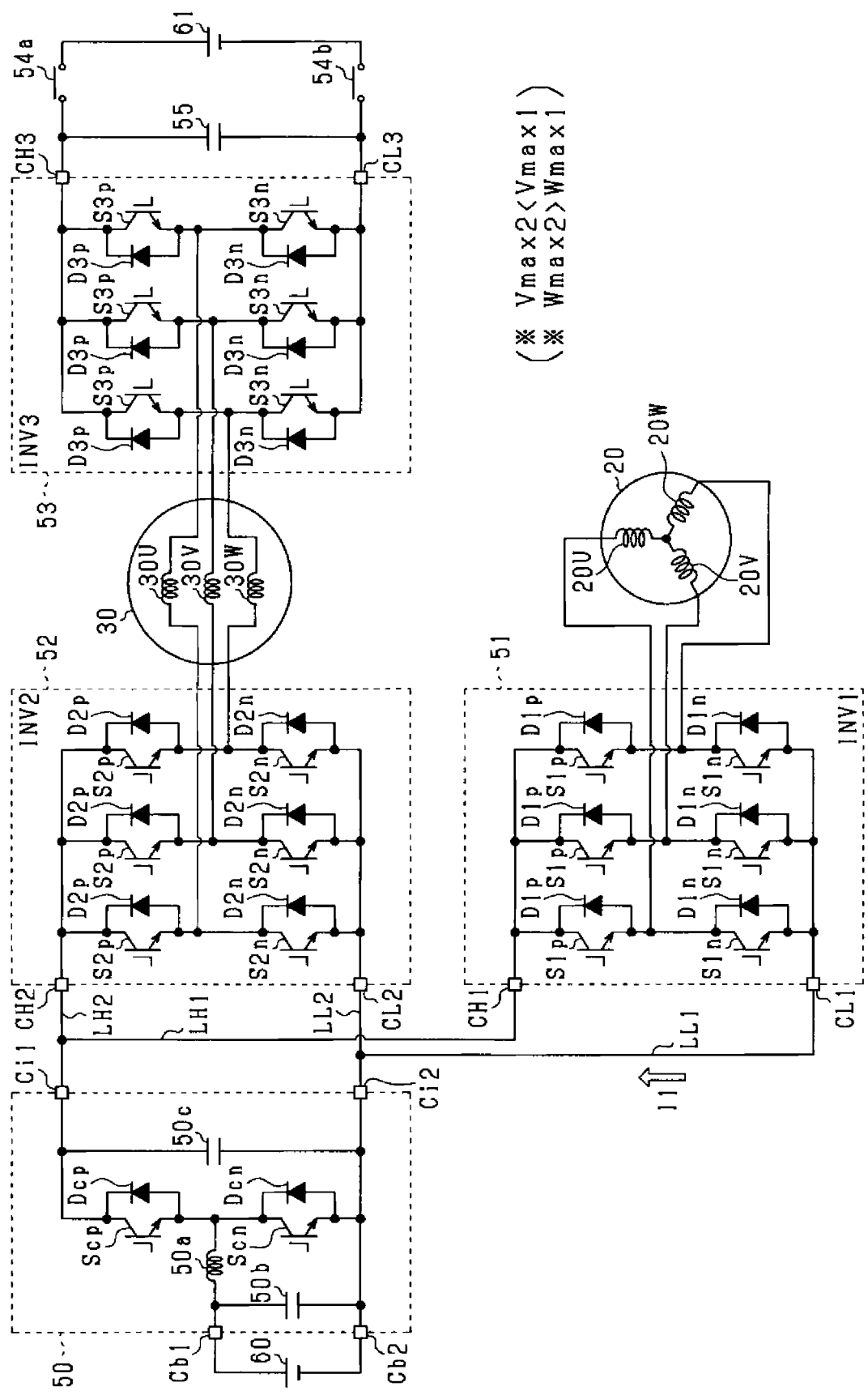
FIG. 2 is a diagram illustrating motor generators and inverters.

In contrast to this, in the present embodiment, the second power source 61 and the first motor generator 20 are not electrically connected but are connected by a single connection route without intervention of the third inverter 53, the windings of the second motor generator 30, the second inverter 52, and the first inverter 51 as illustrated in FIG. 2. In other words, the first motor generator 20, the first inverter 51, the second inverter 52, the windings of the second motor generator 30, and the third inverter 53 are connected in this order in an I shape, not in an O shape. Accordingly, in the present embodiment, the second power source 61 and the first motor generator 20 are not directly connected but the third inverter 53 and the first motor generator 20 are connected only by a route passing through the second motor generator 30, and thus no circulating current occurs in the case of charging the first direct-current power source 60 from the first motor generator 20. In addition, in the present embodiment, no circulating current occurs also in the case of charging the second direct-current power source 61 from the second motor generator 30. That is, the two alternating-current power generators are connected by a single connection route and thus no circulating current occurs in the case of charging the direct-current power source from one of the alternating-current power generators. Therefore, it is possible to prevent deterioration in the controllability of the torques and rotation speeds of the first and second motor generators 20 and 30.

In addition, the present embodiment makes it possible to exhibit an advantageous effect of reducing copper loss resulting from the flow of electric current to the electrical paths LH1, LL1, LH2, and LL2. Hereinafter, this advantageous effect will be described in comparison with the related technique.

In the related technique, regenerative power generated by the first motor generator 90 is designated as PW. In the related technique, the output voltage of the first power source 60 is set to 300V. In the present embodiment, the terminal voltage of the second capacitor 50c is set to 600V by the step-up converter 50. In the related technique, the current flow from the first inverter 51 to the first power source 60 is designated as I2. In the present embodiment, the current flow from the first inverter 51 to the step-up converter 50 is designated as I1. In this case, the relationship PW=300 [V]×I2=600 [V]×I1 holds when the generated regenerative power of the first motor generator 90 in the related technique and the generated regenerative power of the first motor generator 20 in the present embodiment are identical. The current I1 in the present embodiment is half the current I2 in the related technique. Therefore, according to the present embodiment, it is possible to reduce copper loss resulting from the flow of current to the electrical paths LH1, LL1, LH2, and LL2. The reduction of copper loss makes it possible to prevent deterioration in the efficiency of the driving system due to thermal loss and eliminates the need to use large-diameter lines for the electrical paths LH1, LL1, LH2, and LL2.

Further, according to the present embodiment, it is possible to supply power directly from the second power source 61 to the second motor generator 30 without supplying power from the first power source 60 to the second motor generator 30 via the second motor generator 30. This eliminates the need to increase the output power of the step-up converter 50, which achieves downsizing of the step-up converter 50 and reduction in the cost of the step-up converter 50.

According to the present embodiment, the following advantageous effect can also be obtained.

The maximum output power Wmax2 of the second power source 61 is set to be larger than the maximum output power Wmax1 of the first power source 60. This makes it possible to downsize the step-up converter 50, thereby reducing the cost of the step-up converter 50.

Since the rated voltage Vmax2 of the second power source 61 is set to be lower than the rated voltage Vmax1 of the first power source 60, this makes it possible to lower the voltage to be applied from the second power source 61 to the third inverter 53 and the DCDC converter 70, thereby reducing the withstand voltage required for the third inverter 53 and the DCDC converter 70.

The first power source 60 is in common among the first motor generator 20, the second motor generator 30, and the auxiliary machine 73. This decreases the number of power sources as compared to the configuration in which individual power sources are provided to the motor generators 20 and 30 and the auxiliary machine 73. This makes it possible to downsize the driving system and reduce the cost of the driving system.

Second Embodiment

A second embodiment will be described mainly taking differences from the first embodiment with reference to the drawings. In the present embodiment, a general ECU 86 performs discharge control of a second capacitor 50c and a third capacitor 55.

Figure 7:
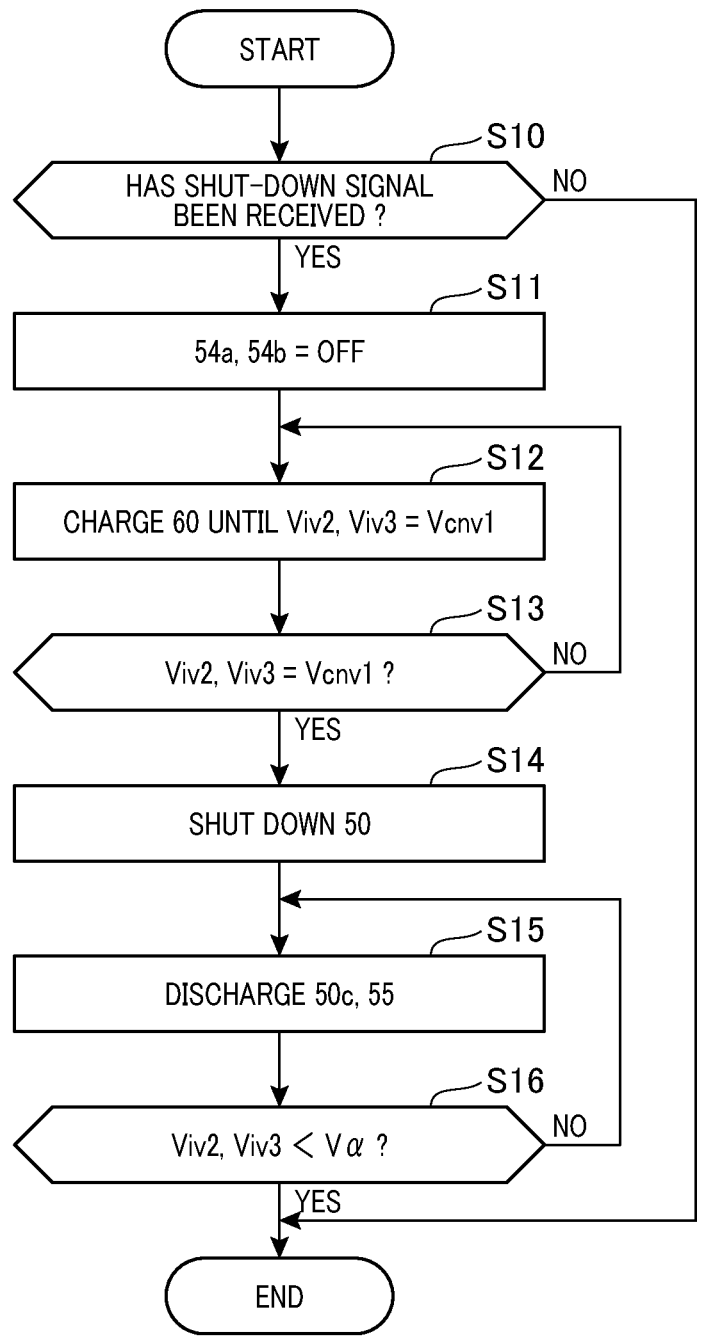
FIG. 7 is a flowchart of a procedure for a discharge control process according to a second embodiment.

FIG. 7 illustrates a procedure of discharge control according to the present embodiment. This processing is repeatedly executed by the general ECU 86 in a predetermined cycle, for example.

In the series of steps, first, in step S10, the general ECU 86 determines whether a shut-down signal for the driving system has been received. The shut-down signal is supposed to be transferred, for example, when the driver has operated a switch for instruction to stop the vehicle.

When determining in step S10 that the signal has been received, the general ECU 86 proceeds to step S11 to switch off a first relay 54a and a second relay 54b.

In step S12, the general ECU 86 controls the second inverter 52, the third inverter 53, and the step-up converter 50 until the second power source voltage Viv2 and the third power source voltage Viv3 meet a first converter voltage Vcnv1. Accordingly, the first power source 60 is charged with discharge power of the third capacitor 55 and the second capacitor 50c higher in terminal voltage than the first power source 60.

In step S12, specifically, the general ECU 86 turns on at least one of the upper arm second switches S2p of the second inverter 52, and turns on at least one of the upper arm third switches S3p of the third inverter 53. In addition, the general ECU 86 performs a step-down action to turn on and off the upper arm step-up switch Scp. Accordingly, electric current flows from the second capacitor 50c and the third capacitor 55 to the first power source 60 to charge the first power source 60.

In actuality, the general ECU 86 instructs the ECUs 82, 83, and 84 corresponding to the inverters 51, 52, and 53 to perform controls. Accordingly, for example, the upper arm second switches S2p of the second inverter 52 are controlled by the second inverter ECU 83 instructed by the general ECU 86. The same thing is applied to the step-up converter 50.

In step S13, the general ECU 86 continues to perform step S12 until it is determined that the second power source voltage Vinv and the third power source voltage Viv3 are equal to the first converter voltage Vcnv1. In the present embodiment, the processing in steps S12 and S13 is equivalent to a "first discharge control unit".

When making an affirmative determination in step S13, the general ECU 86 proceeds to step S14 to shut down the step-up converter 50 and turn off the step-up switches Scp and Scn.

In step S15, the general ECU 86 controls the second inverter 52 and the third inverter 53 to discharge electric charge accumulated in the second capacitor 50c and the third capacitor 55. In the present embodiment, the general ECU 86 discharges the electric charge accumulated in the second capacitor 50c and the third capacitor 55 by controlling the second inverter 52 and the third inverter 53 to flow electric energy accumulated in the second capacitor 50c and the third capacitor 55 to the phase windings 30U, 30V, and 30W of the second motor generator 30 so that the electrical energy is emitted as thermal energy.

In step S16, the general ECU 86 continues to perform step S15 until determining that each of the second power source voltage Viv2 and the third power source voltage Viv3 falls under a predetermined voltage Va. In the present embodiment, the processing in steps S15 and S16 is equivalent to a "second discharge control unit".

According to the present embodiment described above, the first power source 60 is charged with the remaining charge in the second capacitor 50c and the third capacitor 55, which makes it possible to reduce electric power consumption indicating fuel consumption of the engine 10 per unit generated power in the driving system. In addition, according to the present embodiment, the discharge control is performed to prevent the user of the vehicle from getting an electric shock by contact with the driving system.

Third Embodiment

Figure 8:
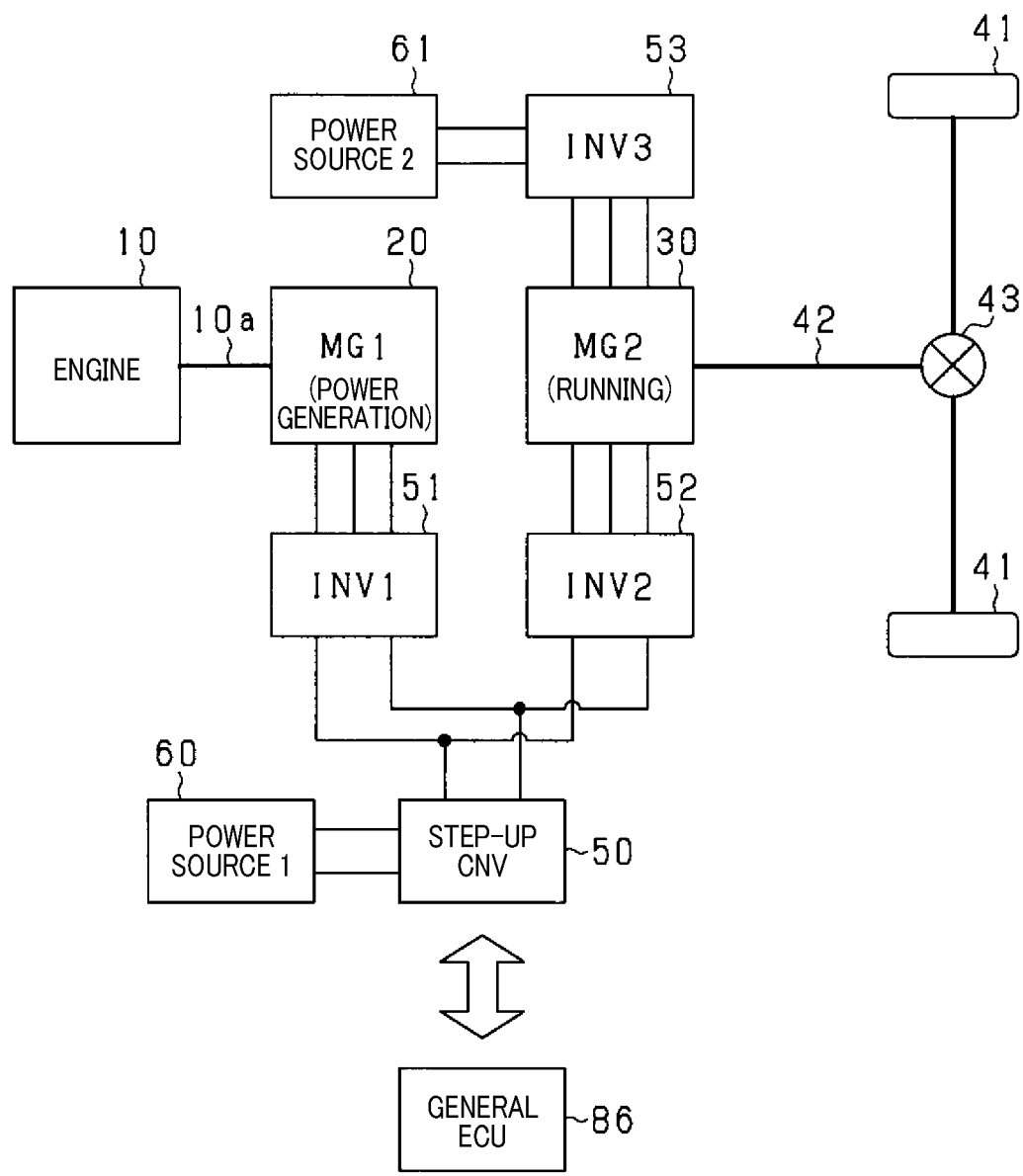
FIG. 8 is an overall configuration diagram of an in-vehicle driving system according to a third embodiment.

A third embodiment will be described mainly taking differences from the first embodiment with reference to the drawings. In the present embodiment, a driving system is mounted in a range-extender vehicle as illustrated in FIG. 8. For the sake of convenience, in FIG. 8, the same components as those illustrated in FIG. 1 are given the same reference numerals as those in FIG. 1.

As illustrated in FIG. 8, a rotation shaft of a rotor of a first motor generator 20 is connected to an output shaft 10a of an engine 10. In the present embodiment, the engine 10 is used not as a running power source of the vehicle but as a motive power source for driving the first motor generator 20 as a power generator.

The rotation shaft of the rotor of the second motor generator 30 is connected to driving wheels 41 via a driving shaft 42 and a differential gear 43.

According to the present embodiment described above, the same advantageous effect as that of the first embodiment can be obtained.

Fourth Embodiment

Figure 9:
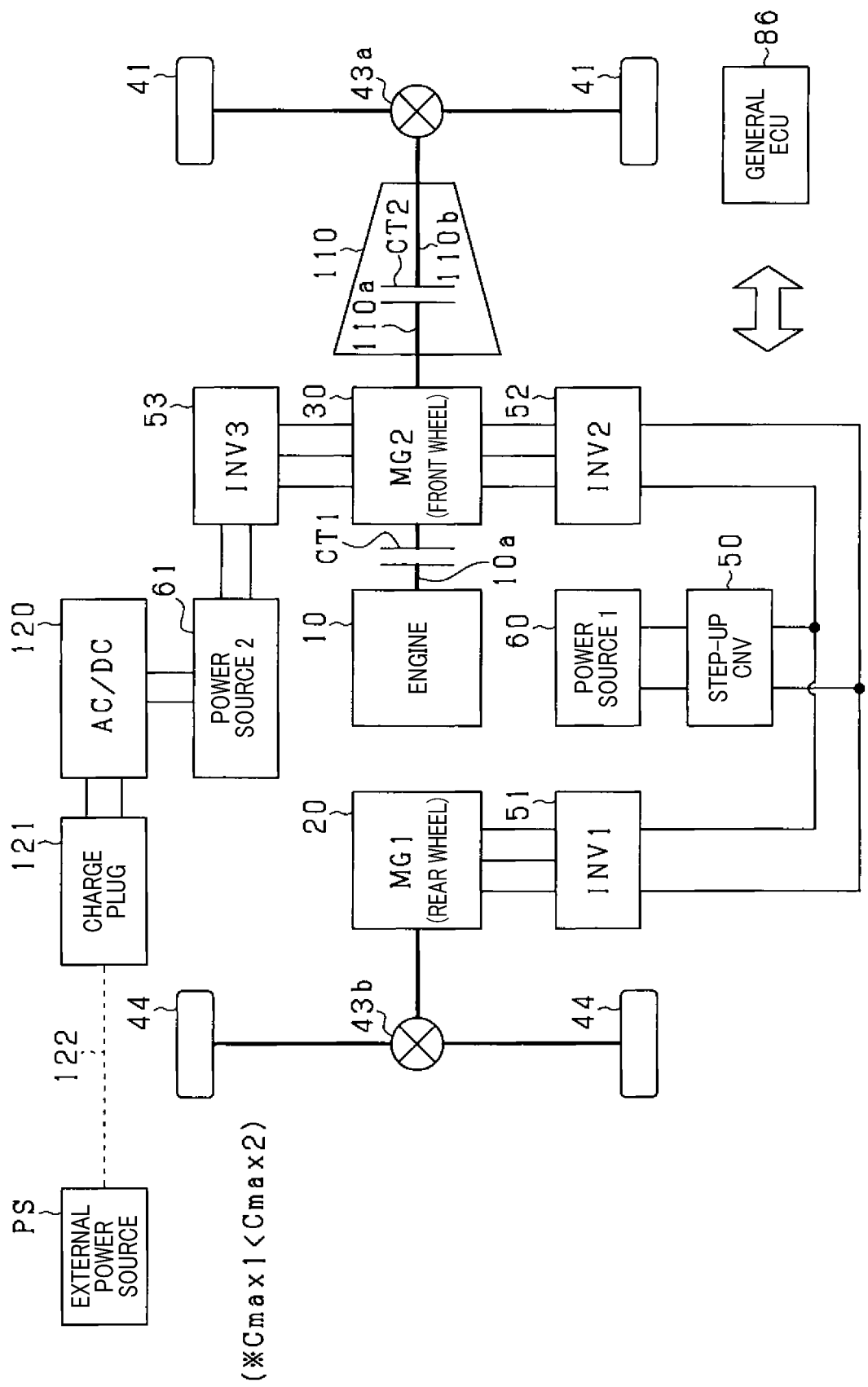
FIG. 9 is an overall configuration diagram of an in-vehicle driving system according to a fourth embodiment.

A fourth embodiment will be described mainly taking differences from the first embodiment with reference to the drawings. In the present embodiment, a driving system is mounted in an electrical four-wheel-drive plug-in hybrid vehicle as illustrated in FIG. 9. For the sake of convenience, in FIG. 9, the same components as those illustrated in FIG. 1 are given the same reference numerals as those in FIG. 1.

As illustrated in FIG. 9, the vehicle includes a first clutch CT1 and a gearbox 110. The first clutch CT1 is provided in a motive power transmission path from an output shaft 10a of an engine 10 to a rotation shaft of a rotor of a second motor generator 30. Disengaging the first clutch CT1 shuts off motive power transmission between the output shaft 10a and the rotation shaft of the rotor of the second motor generator 30. On the other hand, engaging the first clutch CT1 enables motive power transmission between the output shaft 10a and the rotation shaft of the rotor of the second motor generator 30. The first clutch CT1 is operated by a general ECU 86.

The gearbox 110 is provided in a motive power transmission path from the rotation shaft of the rotor of the second motor generator 30 to a first differential gear 43a. An input shaft 110a of the gearbox 110 is connectable to an output shaft 110b of the gearbox 110 via a second clutch CT2. Disengaging the second clutch CT2 shuts off motive power transmission between the input shaft 110a and the output shaft 110b of the gearbox 110. On the other hand, engaging the second clutch CT2 enables motive power transmission between the input shaft 110a and the output shaft 110b. The second clutch CT2 can be operated by the general ECU 86.

The output shaft 110b of the gearbox 110 is connected to front wheels 41 via the first differential gear 43a. On the other hand, a rotation shaft of a rotor of a first motor generator 20 is connected to rear wheels 44 via a second differential gear 43b.

The vehicle includes an ACDC converter 120 as a charger and a charge plug 121. The charge plug 121 and an external power source PS as an alternating-current power source for commercial power supply provided outside the vehicle can be connected by a charge cable 122. While the charge plug 121 and the external power source PS are connected by the charge cable 122, the general ECU 86 controls the ACDC converter 120 such that alternating-current voltage input into the ACDC converter 120 via the charge plug 121 is converted into direct-current voltage and supplied to the second power source 61. Accordingly, the second power source 61 is charged by the external power source PS.

According to the present embodiment described above, the number of ACDC converters can be decreased as compared to the configuration in which an ACDC converter is included in both the first power source 60 and the second power source 61. This achieves reduction in the cost of the driving system.

In the present embodiment, a battery capacity Cmax1 of the first power source 60 is set to be smaller than a battery capacity Cmax1 of the second power source 61. Accordingly, even in the case of charging the first power source 60 using a charging path from the charge plug 121 to the first power source 60 via the ACDC converter 120, the third inverter 53, the windings of the second motor generator 30, the second inverter 52, and the step-up converter 50, the amount of power supplied from the second power source 61 to the first power source 60 via the charging path does not become excessively large. Accordingly, loss in the charging path does not become excessively large, thereby reducing the influence of the reduction in the charging efficiency on the running distance of the vehicle.

Further, the battery capacity Cmax1 of the first power source 60 is set to be smaller than the battery capacity Cmax1 of the second power source 61, which eliminates the need to charge the first power source 60 via the charging path. In this case, no loss occurs in the charging path at the time of charging the first power source 60, thereby improving the efficiency of charging the power source constituting the driving system.

In the present embodiment, the second power source 61 can be directly charged from the external power source PS via the charge plug 121 and the ACDC converter 120. Accordingly, the efficiency of charging the second power source 61 can be improved. This makes it possible to improve the charging efficiency as compared to the case in which the battery capacities of the first power source 60 and the second power source 61 are set to an identical value.

The driving system according to the present embodiment may be applied to an electrical two-wheel-drive vehicle instead of the electrical four-wheel-drive vehicle.

Fifth Embodiment

Figure 10:
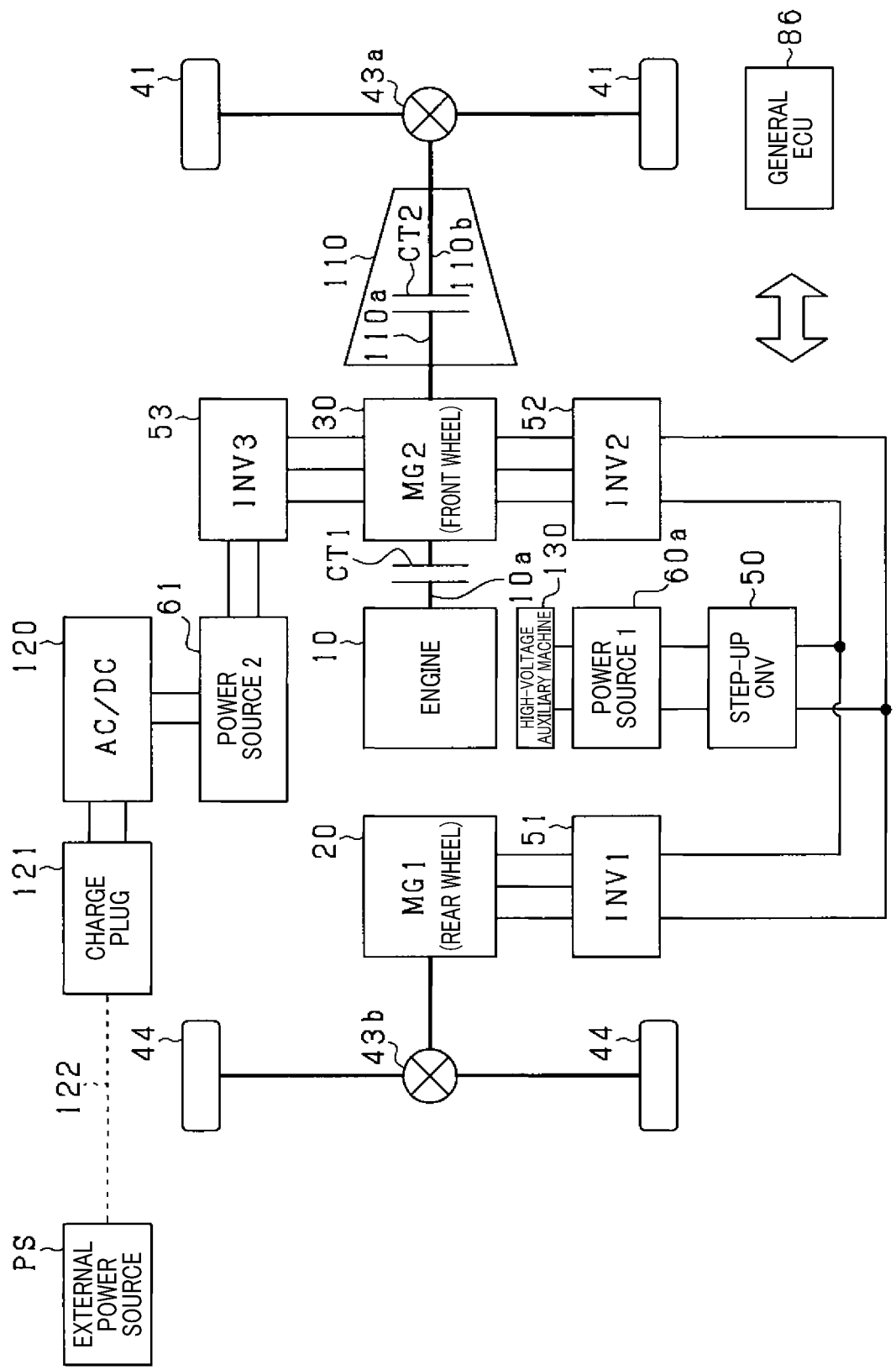
FIG. 10 is an overall configuration diagram of an in-vehicle driving system according to a fifth embodiment.
Figure 11:
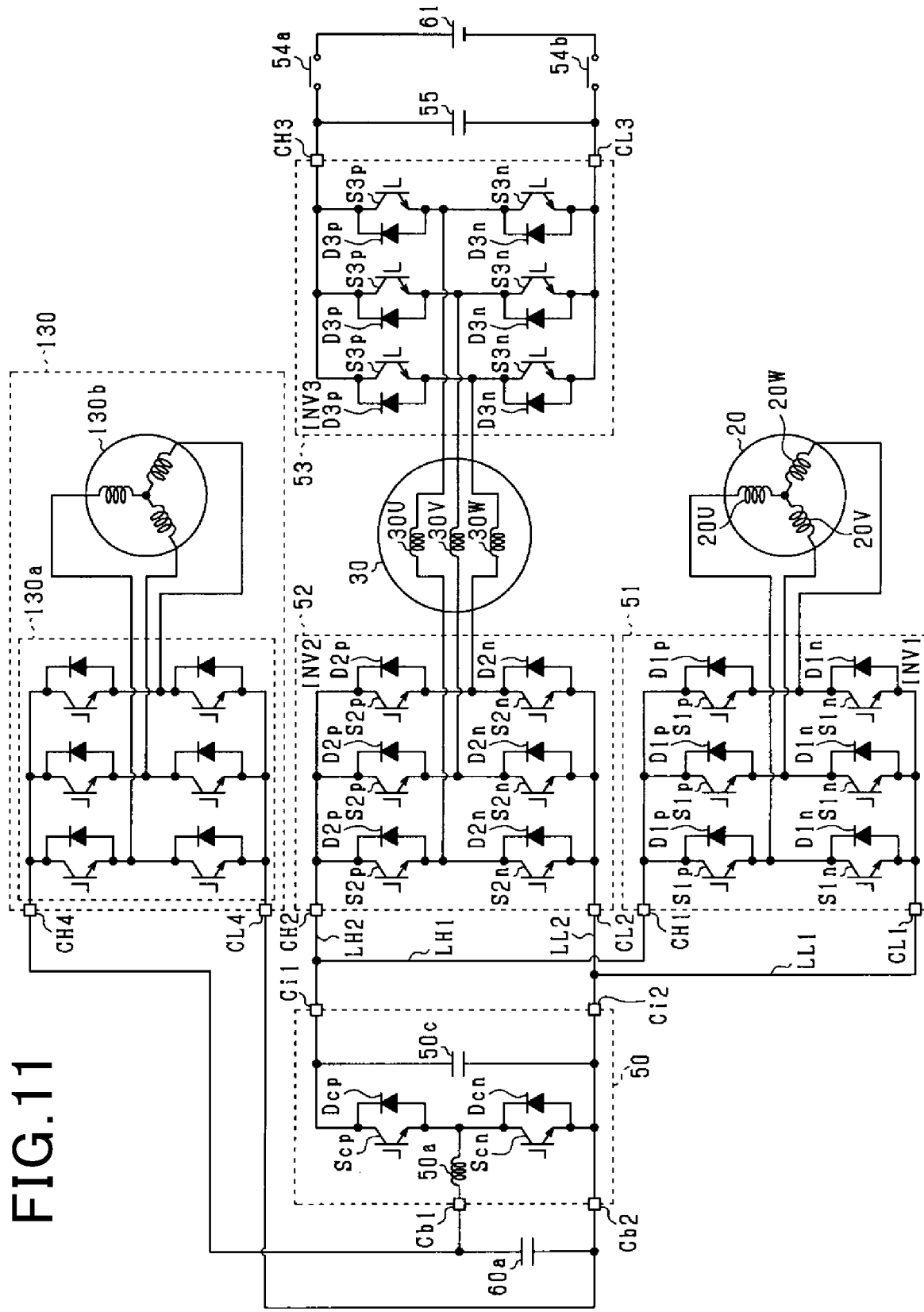
FIG. 11 is a diagram illustrating motor generators and inverters.

A fifth embodiment will be described mainly taking differences from the fourth embodiment with reference to the drawings. In the present embodiment, as illustrated in FIGS. 10 and 11, a capacitor is used instead of the secondary battery as a first power source 60a. In addition, a high-voltage auxiliary machine 130 is connected to the first power source 60a. For the sake of convenience, in FIGS. 10 and 11, the same components as those illustrated in FIGS. 2 and 9 are given the same reference numerals as those in FIGS. 2 and 9.

As illustrated in FIG. 11, in the present embodiment, a step-up converter 50 does not include a first capacitor 50b. A high potential side terminal of the first power source 60a is connected to a first power source-side terminal Cb1, and a low-potential side terminal of the first power source 60a is connected to a second power source-side terminal Cb2.

A first auxiliary machine terminal CH4 as a terminal of the high-voltage auxiliary machine 130 is connected to the high potential side terminal of the first power source 60a, and a second auxiliary machine terminal CL4 as a terminal of the high-voltage auxiliary machine 130 is connected to the low-potential side terminal of the first power source 60a. The high-voltage auxiliary machine 130 includes an auxiliary machine inverter 130a as an inverter connected to the auxiliary machine terminals CH4 and CL4 and an auxiliary rotary electrical machine 130b as a rotary electrical machine connected to an auxiliary machine inverter 130a. The high-voltage auxiliary machine 130 can include at least one of a high-voltage starter that provides initial rotation of an output shaft 10a and an electric compressor constituting an air-conditioner performing air-conditioning of the vehicle interior, for example.

Figure 12:
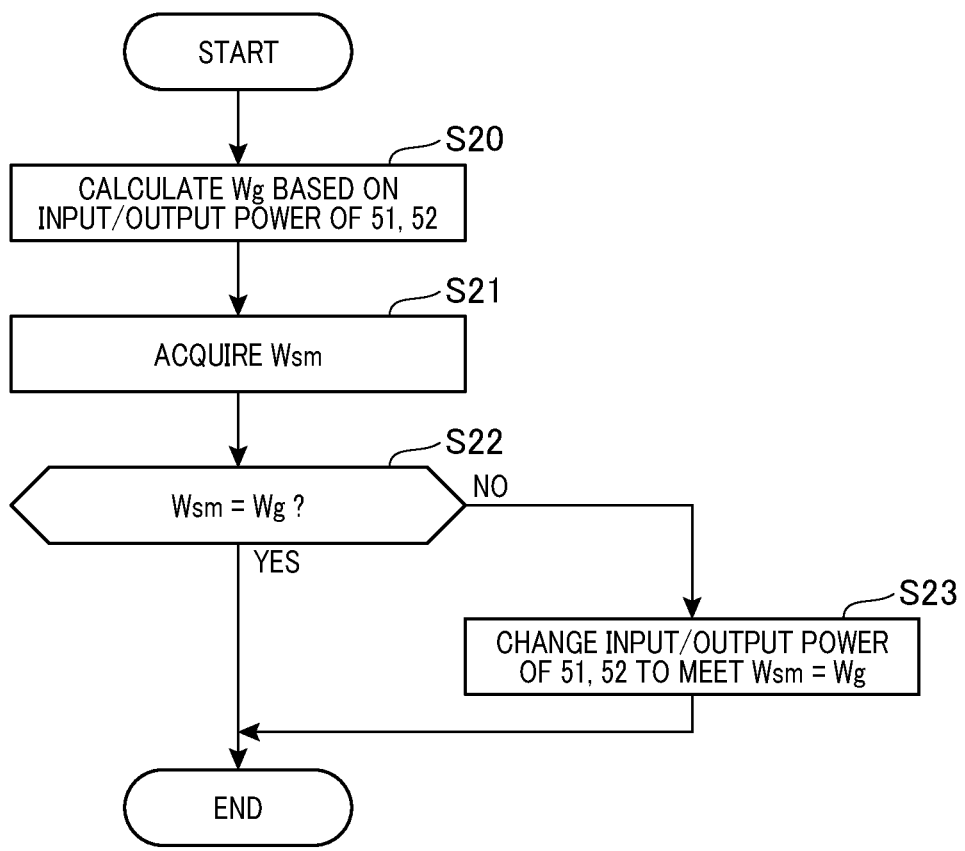
FIG. 12 is a flowchart of a procedure for a voltage drop prevention process.

FIG. 12 illustrates a procedure for a voltage drop prevention control such that the terminal voltage of the first power source 60a is not excessively lowered. This process is repeatedly executed by the general ECU 86 in a predetermined cycle, for example.

In this series of steps, first, in step S20, the general ECU 86 calculates regenerative power Wg to be supplied from a first inverter 51 and a second inverter 52 to the first power source 60a based on input/output power of the first inverter 51 and the second inverter 52.

In step S21, the general ECU 86 acquires required output power Wsm of the high-voltage auxiliary machine 130. In the present embodiment, the processing in step S21 is equivalent to an "output acquisition unit".

In step S22, the general ECU 86 determines whether the required output power Wsm acquired in step S21 is equal to the regenerative power Wg calculated in step S20.

When not determining in step S22 that the required output power Wsm is equal to the regenerative power Wg, the general ECU 86 proceeds to step S23 to change the input/output power of at least one of the first inverter 51 and the second inverter 52 such that the required output power Wsm becomes equal to the regenerative power Wg. Specifically, when both first and second motor generators 20 and 30 are generating regenerative power and the required output power Wsm is smaller than the regenerative power Wg, the general ECU 86 changes the control of at least one of the first and second inverters 51 and 52 such that the total generated regenerative power of the first and second motor generators 20 and 30 becomes small. When both the first and second motor generators 20 and 30 are generating regenerative power and the required output power Wsm is larger than the regenerative power Wg, the general ECU 86 changes the control of at least one of the first and second inverters 51 and 52 such that the total generated regenerative power of the first and second motor generators 20 and 30 becomes large. On the other hand, when the first motor generator 20 is generating regenerative power, the second motor generator 30 is driven for power running and the required output power Wsm is larger than the regenerative power Wg, the general ECU 86 changes the control of the second inverter 52 such that the power consumption of the second motor generator 30 becomes small.

Figure 13:
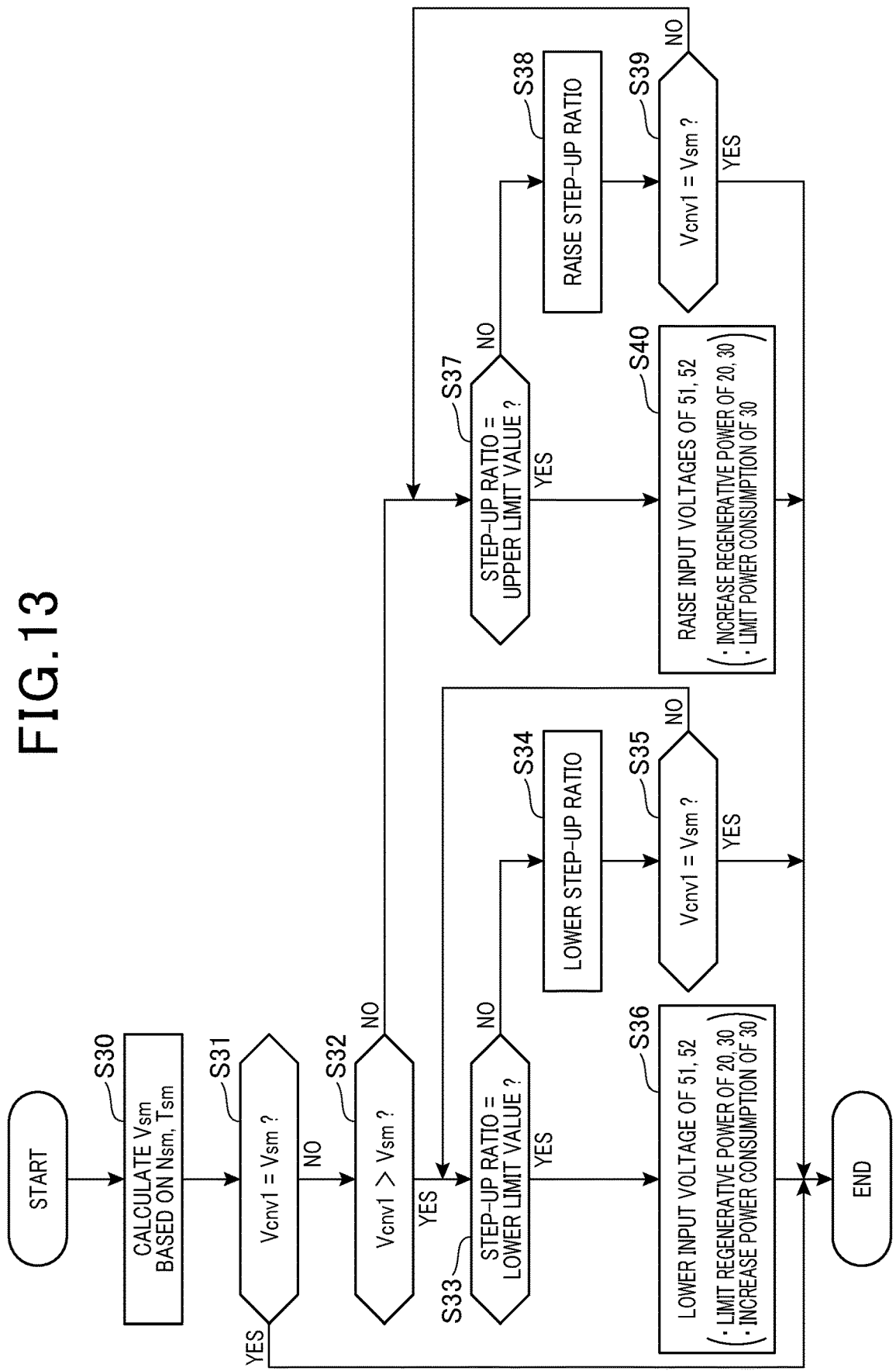
FIG. 13 is a flowchart of a procedure for a control process of an auxiliary machine required voltage.

FIG. 13 illustrates a procedure for a process of adjusting the terminal voltage of the first power source 60a to improve the efficiency of converting input power of the high-voltage auxiliary machine 130 to output power of the auxiliary rotary electrical machine 130b. This process is repeatedly executed by the general ECU 86 in a predetermined cycle, for example.

In this series of steps, first, in step S30, the general ECU 86 acquires rotation speed Nsm and torque Tsm of the high-voltage auxiliary machine 130. Then, based on the acquired rotation speed Nsm and torque Tsm, the general ECU 86 calculates auxiliary machine required voltage Vsm as an instructed value of input voltage from the first power source 60a to the auxiliary machine inverter 130a. In the present embodiment, the auxiliary machine required voltage Vsm is set such that the efficiency of converting the input power of the high-voltage auxiliary machine 130 to the output power of the auxiliary rotary electrical machine 130b becomes highest with respect to the acquired rotation speed Nsm and torque Tsm. The auxiliary machine required voltage Vsm can be calculated based on map information in which the auxiliary machine required voltage Vsm is prescribed in association with the rotation speed Nsm and the torque Tsm, for example. In the present embodiment, the processing in step S30 is equivalent to an "auxiliary machine information acquisition unit" and a "required voltage calculation unit".

In step S31, the general ECU 86 determines whether a first converter voltage Vcnv1 as a detection value of the terminal voltage of the first power source 60a is equal to the auxiliary machine required voltage Vsm calculated in step S30. When not determining in step S31 that the first converter voltage Vcnv1 is equal to the auxiliary machine required voltage Vsm, the general ECU 86 proceeds to step S32 to determine whether the first converter voltage Vcnv1 is higher than the auxiliary machine required voltage Vsm calculated in step S30.

When determining in step S32 that the first converter voltage Vcnv1 is higher than the auxiliary machine required voltage Vsm, the general ECU 86 proceeds to step S33 to determine whether a step-up ratio of the step-up converter 50 is equal to a lower limit value (for example, 1). The step-up ratio here refers to the ratio (Vout/Vin) of the terminal voltage Vout of the second capacitor 50c to the terminal voltage "Vin" of the first power source 60a.

When not determining in step S33 that the step-up ratio is equal to the lower limit value, the general ECU 86 proceeds to step S34 to control the step-up converter 50 to lower the step-up ratio. Specifically, the general ECU 86 decreases the on-time of the lower arm step-up switch Scn in one switching cycle. With a reduction in the step-up ratio, the current flow from the first power source 60a to the step-up converter 50 increases to lower the terminal voltage of the first power source 60a toward the auxiliary machine required voltage Vsm.

In step S35, the general ECU 86 determines whether the first converter voltage Vcnv1 is equal to the auxiliary machine required voltage Vsm. When not determining in step S35 that the first converter voltage Vcnv1 is equal to the auxiliary machine required voltage Vsm, the general ECU 86 proceeds to step S33.

On the other hand, when determining in step S33 that the step-up ratio is equal to the lower limit value, the general ECU 86 proceeds to step S36 to change the control of at least one of the first and second inverters 51 and 52 to lower the terminal voltage of the second capacitor 50c, that is, the input voltage of the first or second inverters 51 or 52. Specifically, the general ECU 86 changes the control of at least one of the first and second inverters 51 and 52 to limit the total regenerative power of the first and second motor generators 20 and 30 by a limit value or decrease the total regenerative power. Otherwise, the general ECU 86 changes the control of the second inverter 52 to increase the power consumption of the second motor generator 30 driven for power running.

When determining in step S32 that the first converter voltage Vcnv1 is lower than the auxiliary machine required voltage Vsm, the general ECU 86 proceeds to step S37 to determine whether the step-up ratio of the step-up converter 50 is equal to an upper limit value (>1).

When not determining in step S37 that the step-up ratio is equal to the upper limit value, the general ECU 86 proceeds to step S38 to change the control of the step-up converter 50 to raise the step-up ratio. Specifically, the general ECU 86 increases the on-time of the lower arm step-up switch Scn in one switching cycle. With a rise in the step-up ratio, the current flow from the first power source 60a to the step-up converter 50 decreases to raise the terminal voltage of the first power source 60a toward the auxiliary machine required voltage Vsm.

In step S39, the general ECU 86 determines whether the first converter voltage Vcnv1 is equal to the auxiliary machine required voltage Vsm. When not determining in step S39 that the first converter voltage Vcnv1 is equal to the auxiliary machine required voltage Vsm, the general ECU 86 proceeds to step S37.

On the other hand, when determining in step S37 that the step-up ratio is equal to the upper limit value, the general ECU 86 proceeds to step S40 to change the control of at least one of the first and second inverters 51 and 52 to raise the terminal voltage of the second capacitor 50c, that is, the input voltage of the first or second inverters 51 or 52. Specifically, the general ECU 86 changes the control of at least one of the first and second inverters 51 and 52 to increase the total regenerative power of the first and second motor generators 20 and 30. Otherwise, the general ECU 86 changes the control of the second inverter 52 to limit the power consumption of the second motor generator 30 driven for power running by a limit value or decrease the power consumption.

According to the present embodiment described above, it is possible to prevent the occurrence of a voltage drop that is a significant reduction in the terminal voltage of the first power source 60a along with the driving of the high-voltage auxiliary machine 130. Accordingly, the terminal voltage of the first power source 60a can be equal to or greater than the minimum operating voltage of the high-voltage auxiliary machine 130, thereby stably driving the high-voltage auxiliary machine 130.

Sixth Embodiment

Figure 14:
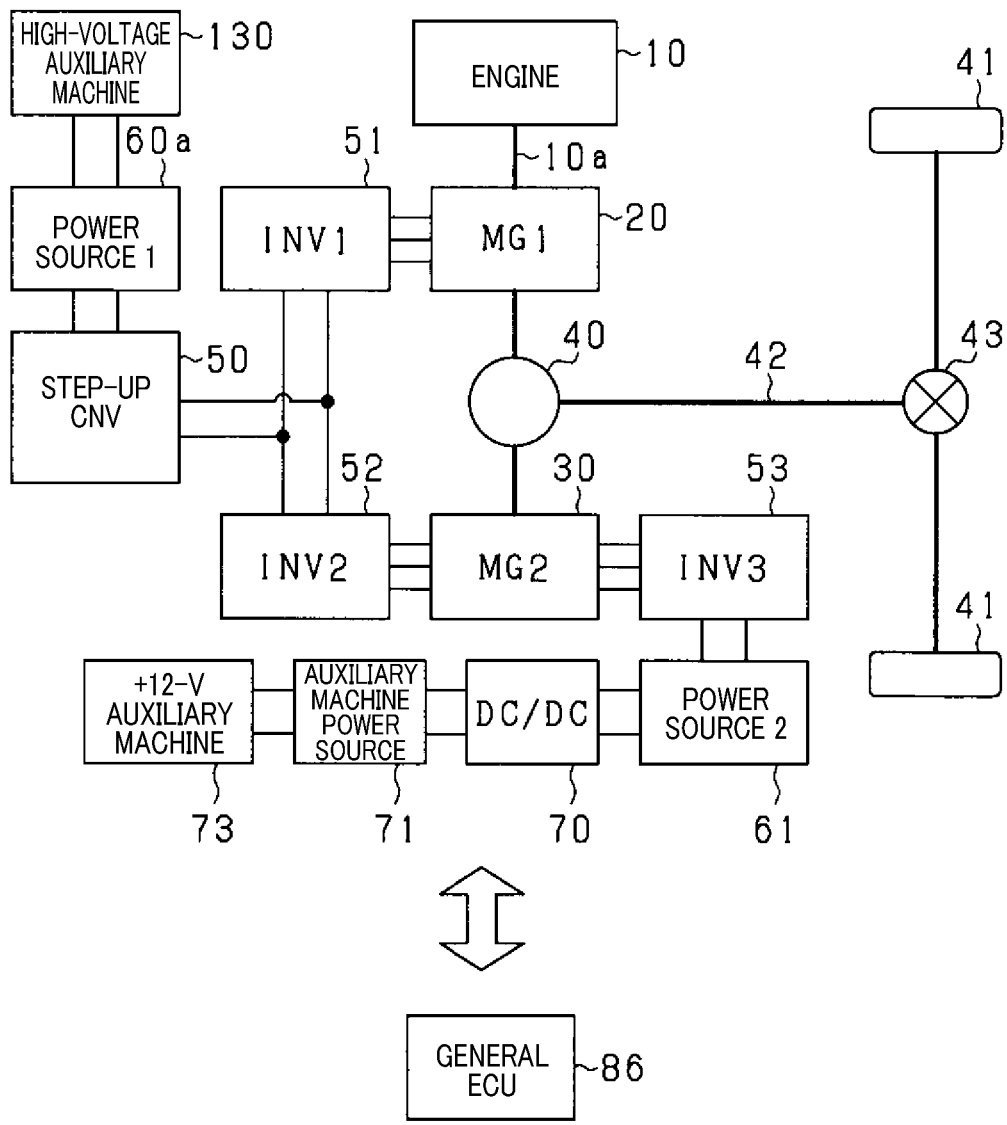
FIG. 14 is an overall configuration diagram of an in-vehicle driving system according to a sixth embodiment.

A sixth embodiment will be described mainly taking differences from the fifth embodiment with reference to the drawings. In the present embodiment, as illustrated in FIG. 14, the configuration illustrated in FIG. 11 is applied to the hybrid vehicle in the first embodiment illustrated in FIG. 1. For the sake of convenience, in FIG. 14, the same components as those illustrated in FIGS. 1 and 11 are given the same reference numerals as those in FIGS. 1 and 11.

Referring to FIG. 14, a high-voltage auxiliary machine 130 can be at least one of ISG having the functions of high-voltage starter, starter, and alternator, electric compressor, electric hydraulic pump, electric power steering device, and electric turbo charger, for example. The high-voltage auxiliary machine 130 may not necessarily have a rated voltage of 48V but may have a rated voltage lower than that of the first power source 60a (for example, a 12-V lead storage battery).

According to the sixth embodiment, the same advantageous effect as that of the fifth embodiment can be obtained.

Seventh Embodiment

Figure 15:
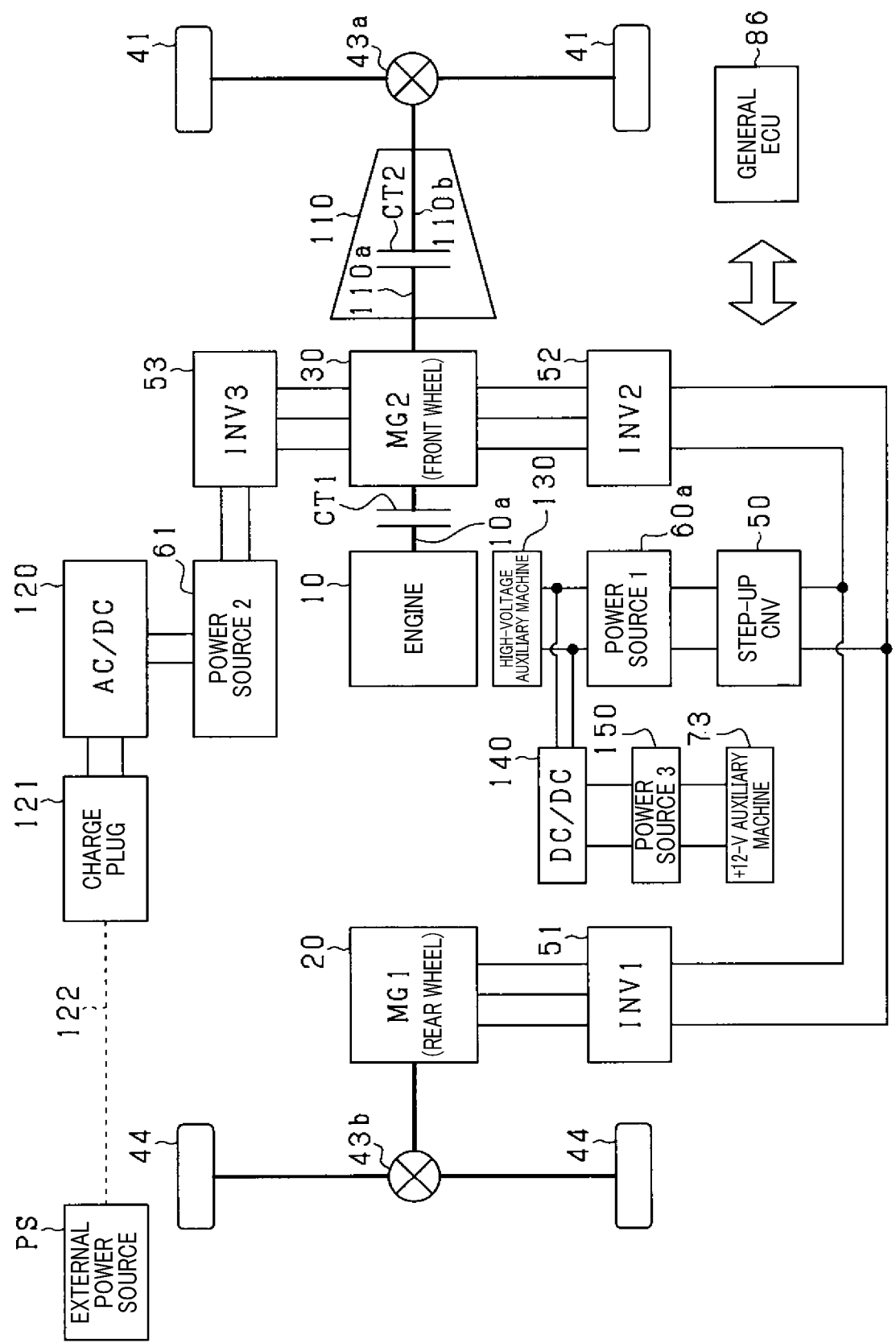
FIG. 15 is an overall configuration diagram of an in-vehicle driving system according to a seventh embodiment.
Figure 16:
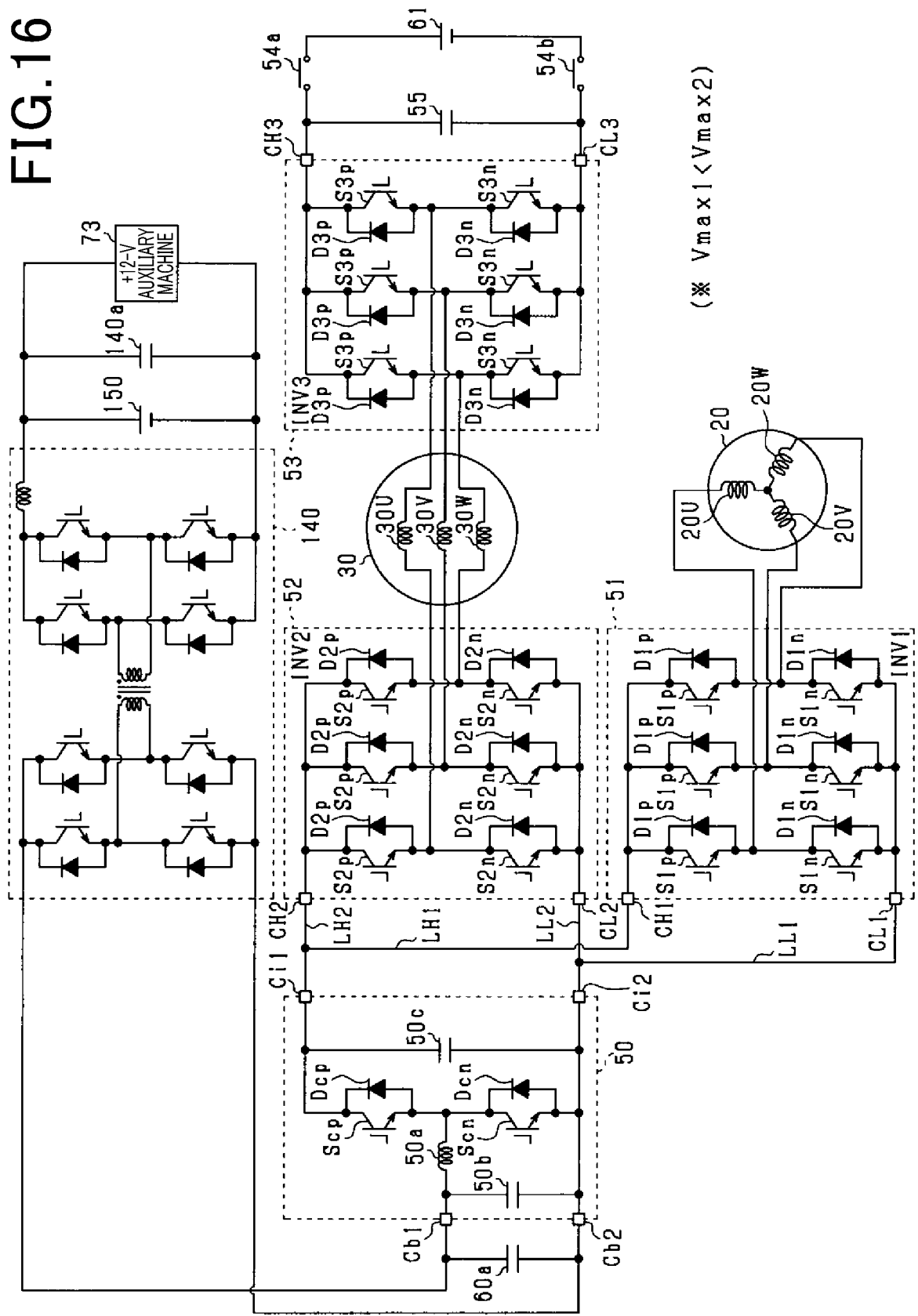
FIG. 16 is a diagram illustrating motor generators and inverters.

A seventh embodiment will be described mainly taking differences from the fifth embodiment with reference to the drawings. In the present embodiment, as illustrated in FIGS. 15 and 16, a vehicle includes a DCDC converter 140 and a third power source 150. For the sake of convenience, in FIGS. 15 and 16, the same components as those illustrated in FIGS. 10 and 11 are given the same reference numerals as those in FIGS. 10 and 11.

As illustrated in FIG. 16, the third power source 150 is connected to a first power source 60a via the DCDC converter 140. In the present embodiment, the rated voltage of the third power source 150 is set to be lower than the rated voltage of the first power source 60a, specifically, the third power source 150 is a lead storage battery with a rated voltage of 12V. An auxiliary machine 73 is connected to the third power source 150.

In the present embodiment, a rated voltage Vmax1 of the first power source 60a is set to be lower than a rated voltage Vmax2 of the second power source 61. In this case, for example, using the second power source 61 with a rated voltage of 48V makes it possible to drive the auxiliary machine with a rated voltage of 48V without including the DCDC converter for 48V in the driving system. This decreases the components of the driving system.

The DCDC converter 140 is a bidirectional insulation converter that has the function of lowering the output voltage of the first power source 60a and outputting the output voltage to the third power source 150 and the function of raising the output voltage of the third power source 150 and outputting the output voltage to the first power source 60a. An auxiliary machine capacitor 140a is included on the third power source 150 side of the DCDC converter 140.

Subsequently, processing by the general ECU 86 will be described with reference to FIGS. 17 and 18.

Figure 17:
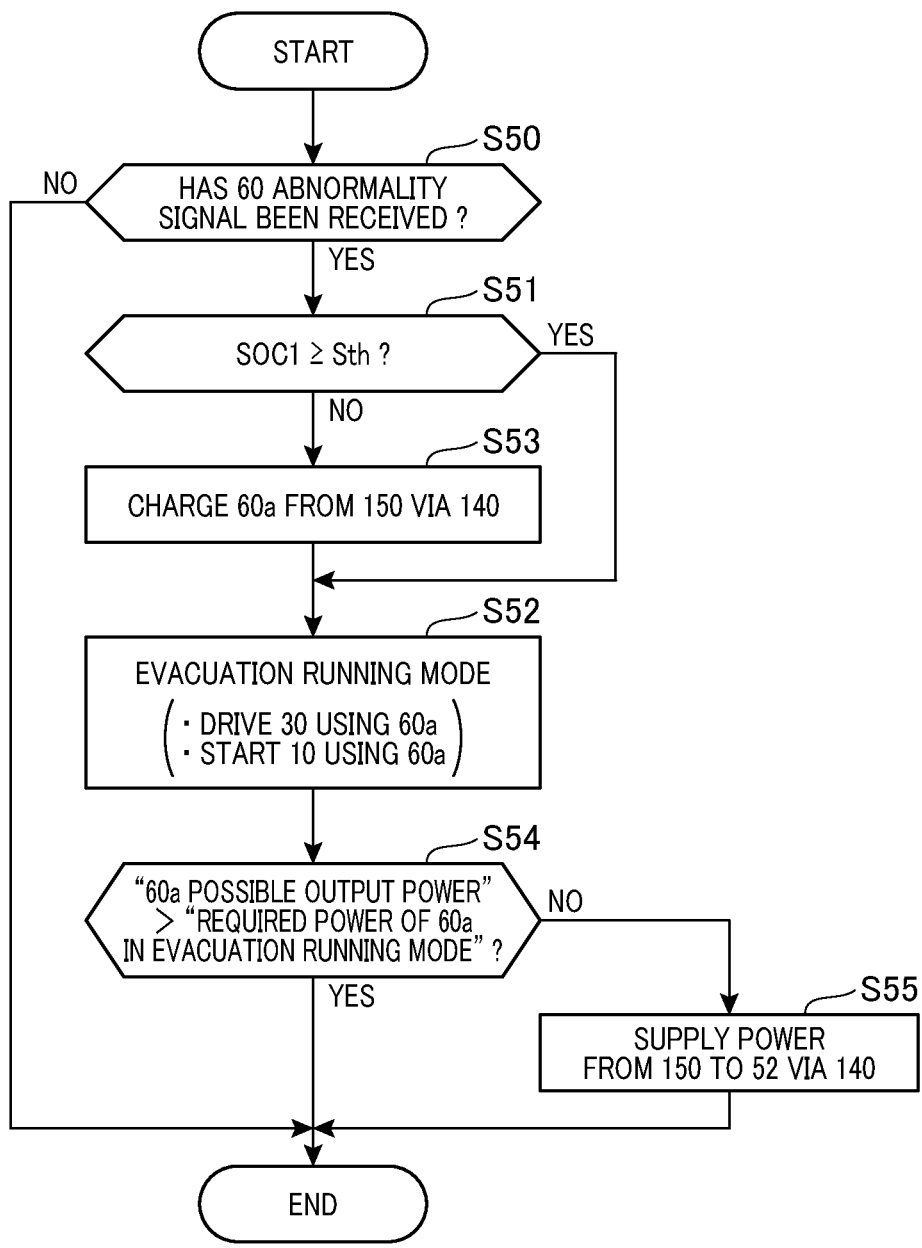
FIG. 17 is a flowchart of a procedure for an evacuation running process.

FIG. 17 illustrates a procedure for processing to be executed in the event of an abnormality in the second power source 61. This process is repeatedly executed by the general ECU 86 in a predetermined cycle, for example.

In this series of steps, first, in step S50, the general ECU 86 determines whether a signal indicating an abnormality in the second power source 61 has been received. The abnormality in the second power source 61 here refers to an abnormality that the second power source 61 cannot be used as a power supply source for the second motor generator 30, for example. Examples of an abnormality in the second power source 61 include a disconnection of at least one of the connection paths connecting the second power source 61 and the third inverter 53 and an open failure in at least one of relays 54a and 54b. In the present embodiment, the processing in step S50 is equivalent to an "abnormality determination unit".

When making an affirmative determination in step S50, the general ECU 86 proceeds to step S51 to determine whether a charging rate SOC1 of the first power source 60a is equal to or greater than a prescribed value Sth. This processing is intended to determine whether the charging rate of the first power source 60a is sufficient.

When making an affirmative determination in step S51, the general ECU 86 determines that the charging rate of the first power source 60a is sufficient and proceeds to step S52. In step S52, the general ECU 86 controls the step-up converter 50 and the second inverter 52 to drive the second motor generator 30 for power running with the first power source 60a as a power supply source. Accordingly, the vehicle can be evacuated only using the second motor generator 30 without using the engine 10.

In step S52, the general ECU 86 can perform the processing described below. That is, the general ECU 86 controls the first inverter 51 such that power is supplied from the first power source 60a to the first motor generator 20 to drive the first motor generator 20 for power-running and provide initial rotation of the output shaft 10a of the engine 10, and starts the combustion of the engine 10. This makes it possible to complete the start of the engine 10 and evacuate the vehicle by using the engine 10. The combustion of the engine 10 is performed under an instruction from the general ECU 86 to the engine ECU 80. In the present embodiment, the processing in step S52 is equivalent to an "evacuation control unit".

On the other hand, when making a negative determination in step S51, the general ECU 86 determines that the charging rate of the first power source 60a is insufficient, and proceeds to step S53. In step S53, the general ECU 86 controls the DCDC converter 140 to charge the first power source 60a from the third power source 150 via the DCDC converter 140. This makes it possible to perform step S52 while ensuring power for evacuation running. In the present embodiment, the processing in step S53 is equivalent to an "abnormality control unit".

After shifting to the evacuation running mode in step S52, the general ECU 86 proceeds to step S54 to determine whether possible output power of the first power source 60a is larger than power required by the first power source 60a for evacuation running.

When making an affirmative determination in step S54, the general ECU 86 determines that the possible output power of the first power source 60a satisfies the power required by the first power source 60a for evacuation running. On the other hand, when making a negative determination in step S54, the general ECU 86 determines that the output power of the first power source 60a is insufficient to satisfy the power required by the first power source 60a for evacuation running, and then proceeds to step S55. In step S55, the general ECU 86 controls the DCDC converter 140 to compensate the second inverter 52 for the insufficient output power from the third power source 150 via the DCDC converter 140. Accordingly, even when the output power of the first power source 60a is insufficient, the evacuation running process can be continued.

Figure 18:
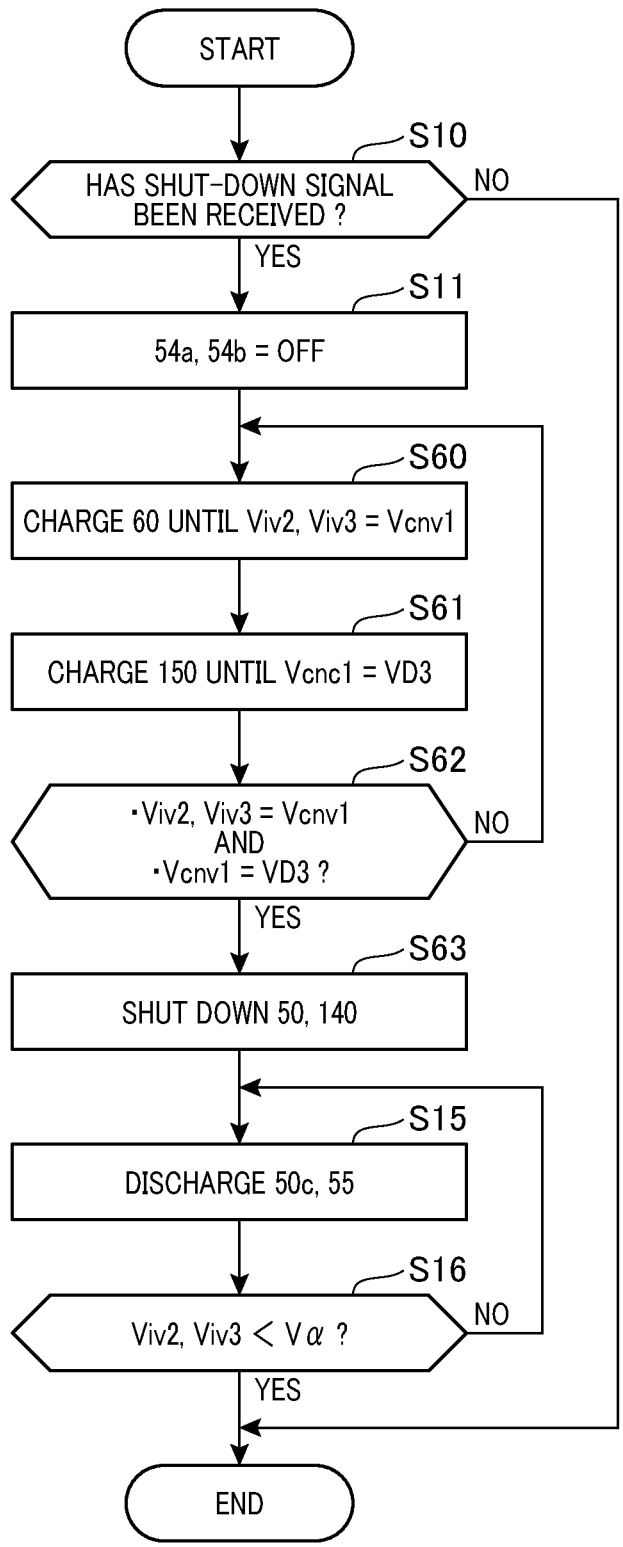
FIG. 18 is a flowchart of a procedure for a discharge control process.

FIG. 18 illustrates a procedure for a discharge control process by the second capacitor 50c and the third capacitor 55. This process is repeatedly executed by the general ECU 86 in a predetermined cycle, for example. For the sake of convenience, in FIG. 18, the same components as those illustrated in FIG. 7 are given the step numbers as those in FIG. 7.

In this series of steps, after completion of step S11, the general ECU 86 proceeds to step S60 to control the second inverter 52, the third inverter 53, and the step-up converter 50 until a second power source voltage Viv2 and a third power source voltage Viv3 meet a first converter voltage Vcnv1. Accordingly, the first power source 60a is charged with discharge power of the third capacitor 55 and the second capacitor 50c higher in terminal voltage than the first power source 60a. The controls of the second inverter 52, the third inverter 53, and the step-up converter 50 can be performed in the same manner as in step S12 of FIG. 7.

In step S61, the general ECU 86 controls the DCDC converter 140 until the first converter voltage Vcnv1 meets an output voltage detection value VD3 of the third power source 150. Accordingly, the third power source 150 is charged with the discharge power of the first power source 60a.

In step S62, the general ECU 86 repeats steps S60 and S61 until determining that the logical product of the condition where the second power source voltage Vinv and the third power source voltage Viv3 are equal to the first converter voltage Vcnv1 and the condition where the first converter voltage Vcnv1 is equal to the output voltage detection value VD3 of the third power source 150 is true. When making an affirmative determination in step S62, the general ECU 86 proceeds to step S63 to shut down the DCDC converter 140 and the step-up converter 50. After that, the general ECU 86 proceeds to step S15.

According to the process described above with reference to FIG. 18, it is possible to reduce electric power consumption of the vehicle and prevent the user of the vehicle from getting an electrical shock by contact with the driving system.

In the present embodiment, the rated voltage of the first power source 60a connected to the DCDC converter 140 is set to be lower than the rated voltage of the second power source 61, and the auxiliary machine 73 is connected to the third power source 150. This makes it possible to increase the step-down ratio of the DCDC converter 140 as compared to the configuration in which the auxiliary machine is connected to the second power source 61 via the DCDC converter, thereby improving the efficiency of power conversion in the DCDC converter 140.

Eighth Embodiment

Figure 19:
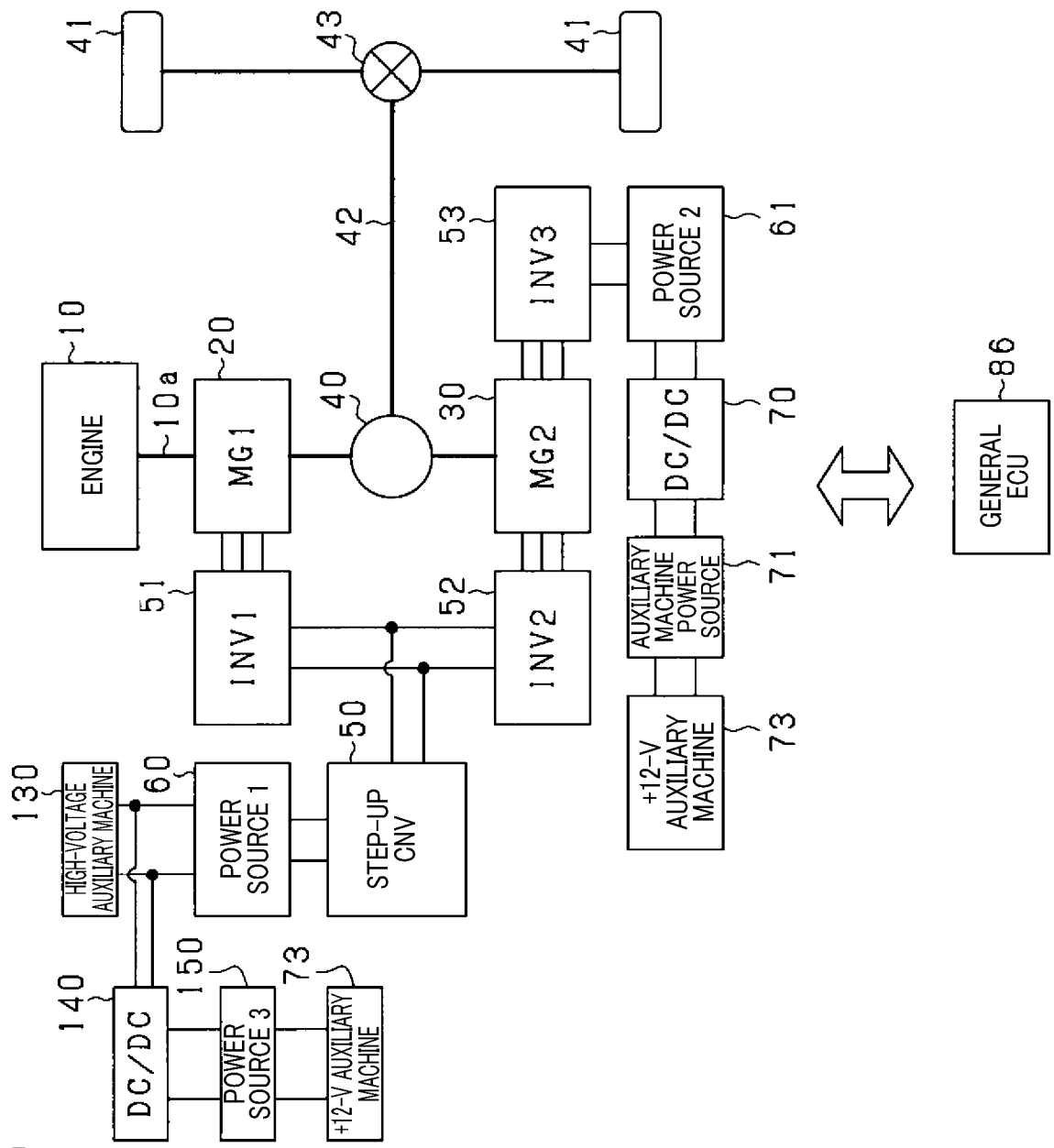
FIG. 19 is an overall configuration diagram of an in-vehicle driving system according to an eighth embodiment.

Hereinafter, an eighth embodiment will be described mainly taking differences from the seventh embodiment with reference to the drawings. In the present embodiment, as illustrated in FIG. 19, the configuration illustrated in FIG. 16 is applied to the hybrid vehicle illustrated in FIG. 1 in the first embodiment. For the sake of convenience, in FIG. 19, the same components as those illustrated in FIGS. 1 and 16 are given the same reference numerals as those in FIGS. 1 and 16.

According to the eighth embodiment described above, the same advantageous effect as that of the fifth embodiment can be obtained.

Other Embodiments

The foregoing embodiments may be modified as described below.

An electric path with a switch may be provided between the third inverter 53 and the first motor generator 20 illustrated in FIG. 1. In this case, for example, the general ECU 86 may control the switch such that the switch is brought into conduction to apply the output voltage of the second power source 61 to the third inverter 53 and that, in the case of charging the first direct-current power source 60 from the first motor generator 20, the switch is shut down so as not to cause flow circulation. In this case as well, in the case of charging the first direct-current power source 60 from the first motor generator 20 or in the case of charging the second direct-current power source 61 from the second motor generator 30, the second direct-current power source 61 and the first motor generator 20 are connected by a single connection route.

In the first embodiment, the second power source 61 can have a rated voltage of 48V and the first power source 60 can have a rated voltage of 12V. In this case, it is possible to apply a high voltage to the second motor generator 30 using both the first power source 60 and the second power source 61 while forming the driving system with low-voltage components with a withstand voltage of 60V or less.

In the first embodiment, instead of the relays 54a and 54b, N-channel MOSFETs with sources connected together may be used, for example.

In the foregoing embodiments, the power sources used as the first power source and the second power source may not be a combination of a secondary battery and a capacitor. For example, a combination of a primary battery such as a fuel battery and a second battery can be used. As the types of the power sources, for example, the second power source can be a fuel battery and the first power source can be a secondary battery. In this case, the first power source can be charged with generated regenerative power.

The rotary electrical machine is not limited to a permanent-magnet field type but may be a winding field type, for example. In addition, the rotary electrical machine is not limited to a synchronous machine but may be an induction machine, for example.

The driving system is not necessarily mounted in a vehicle.

Based on the above exemplary described embodiments, following driving systems of the present disclosure are also provided:

A first disclosure is a driving system with a first alternating-current rotary electrical machine and a second alternating-current rotary electrical machine. The driving system includes: a first inverter that is electrically connected to the first alternating-current rotary electrical machine to drive the first alternating-current rotary electrical machine; a second inverter that is electrically connected to a first end of both ends of each of phase windings constituting the second alternating-current rotary electrical machine to drive the second alternating-current rotary electrical machine; a step-up converter that has a power source-side connection unit electrically connectable to a first direct-current power source and an inverter-side connection unit electrically connected to the first inverter via a first electrical path and electrically connected to the second inverter via a second electrical path and raises an output voltage of the first direct-current power source and outputs the output voltage to the first inverter and the second inverter; and a third inverter that is electrically connected to a second end of the both ends of each of the phase windings constituting the second alternating-current rotary electrical machine, and transfers power to a second direct-current power source different from the first direct-current power source to drive the second alternating-current rotary electrical machine, wherein the second direct-current power source and the first alternating-current rotary electrical machine are connected by a single connection route.

According to the first disclosure, the step-up converter raises the output voltage of the first direct-current power source supplied via the power source-side connection unit. The step-up converter outputs the raised voltage to the first inverter via the inverter-side connection unit and the first electrical path, and outputs the raised voltage to the second inverter via the inverter-side connection unit and the second electrical path. This makes it possible to increase the voltages of the first and second electrical paths as compared to the configuration in the related technique in which the driving system includes no step-up converter but the output voltage of the first direct-current power source is applied directly to the first and second inverters. Accordingly, in the case of supplying generated power from one to the other of the first and second alternating-current rotary electrical machines, the current flow into the first and second electrical paths can be made smaller than that in the related technique for the supply of the same generated power. This makes it possible to reduce a loss caused by the flow of the current to the first and second electrical paths.

According to the first disclosure, the second direct-current power source and the first alternating-current rotary electrical machine are connected by a single connection route. Accordingly, there is no formation of a closed circuit including the first to third inverters and the first and second alternating-current rotary electrical machines, thereby preventing the occurrence of circulating current. This makes it possible to avoid deterioration in the controllability of the first and second alternating-current rotary electrical machines.

In a second disclosure, maximum output power of the second direct-current power source is set to be larger than maximum output power of the first direct-current power source.

Power is supplied from the first direct-current power source to the second alternating-current rotary electrical machine via the step-up converter and the second inverter, and power is supplied from the second direct-current power source to the second alternating-current rotary electrical machine via the third inverter. In this case, when the maximum output power supplied from the second direct-current power source is large, the maximum output power to be supplied from the first direct-current power source can be reduced in return. When the maximum output power of the first direct-current power source can be reduced, it is possible to reduce the maximum output power of the step-up converter and miniaturize a reactor and other components constituting the step-up converter, which results in downsizing of the step-up converter.

In the second disclosure, therefore, the maximum output power of the second direct-current power source is set to be larger than the maximum output power of the first direct-current power source. This makes it possible to downsize the step-up converter and reduce the cost of the step-up converter.

A third disclosure includes a charger that is electrically connected only to the second direct-current power source of the first direct-current power source and the second direct-current power source to charge the second direct-current power source using an external power source provided outside the driving system as a source of power supply.

According to the third disclosure, the number of chargers can be decreased as compared to the configuration in which a charger is provided for both the first direct-current power source and the second direct-current power source. This makes it possible to reduce the cost of the driving system.

In a fourth disclosure, a storage capacity of the first direct-current power source is set to be smaller than a storage capacity of the second direct-current power source.

In the case of charging the first direct-current power source by using a charger, the first direct-current power source needs to be charged using a charging path from the charger to the first direct-current power source via the third inverter, the windings of the second alternating-current rotary electrical machine, the second inverter, and the step-up converter. However, this charging path includes a plurality of power converters that would decrease the charging efficiency.

In the fourth disclosure, therefore, the storage capacity of the first direct-current power source is set to be smaller than the storage capacity of the second direct-current power source. Accordingly, even in the case of charging the first direct-current power source by using the foregoing charging path, the amount of power supplied from the second direct-current power source to the first direct-current power source via the charging path does not become excessively large and thus loss in the charging path does not become excessively large. In addition, the storage capacity of the first direct-current power source is set to be smaller than the storage capacity of the second direct-current power source, which eliminates the need to charge the first direct-current power source via the charging path. This case generates no loss in the charging path due to the charging of the first direct-current power source. Therefore, the fourth disclosure makes it possible to improve the efficiency of charging the power source in the driving system using a charger.

Further, in the fourth disclosure, the second direct-current power source can be charged directly from the external charger, which improves the efficiency of charging the second direct-current power source. This makes it possible to improve the charging efficiency as compared to the case in which the storage capacities of the first direct-current power source and the second direct-current power source are set to the same value.

In a fifth disclosure, an output voltage of the second direct-current power source is set to be lower than an output voltage of the first direct-current power source.

The first direct-current power source is connected via the second inverter and the step-up converter to the first end of each of the phase windings constituting the second alternating-current rotary electrical machine, and the second direct-current power source is connected via the third inverter to the second end of each of the phase windings. Accordingly, the output voltage of the first direct-current power source and the output voltage of the second direct-current power source can be set to different voltage values. In the fifth disclosure, therefore, the output voltage of the second direct-current power source is set to be lower than the output voltage of the first direct-current power source. This makes it possible to lower the voltage applied from the second direct-current power source to the third inverter and lower withstand voltage required for the third inverter.

In a sixth disclosure, the step-up converter is configured to perform a step-down action of lowering a direct-current voltage input from the inverter-side connection unit and supplying the direct-current voltage to the first direct-current power source via the power source-side connection unit. The sixth disclosure includes: a switch unit that is provided in a connection path as an electrical path connecting the third inverter and the second direct-current power source, and when turned on, electrically connects between the third inverter and the second direct-current power source, and when turned off, electrically disconnects between the third inverter and the second direct-current power source; a second capacitor as a smoothing capacitor that is electrically connected to the step-up converter side of the second inverter; a third capacitor as a smoothing capacitor that is electrically connected to the second direct-current power source side of the third inverter; a first discharge control unit that, when determining that a stop instruction signal for the driving system has been input, turns off the switch unit and then instructs the step-up converter to perform the step-down action and control the second inverter and the third inverter so that the first direct-current power source is charged with respective discharge the second capacitor and the third capacitor; and a second discharge control unit that, after discharging electricity from the second capacitor and the third capacitor in response to the instruction from the first discharge control unit, provides an instruction to control the second inverter and the third inverter to further discharge from the second capacitor and the third capacitor.

The six disclosure includes the second capacitor and the third capacitor. After the stop of the driving system, if the terminal voltages of the second capacitor and the third capacitor are high, the user may get an electric shock from the driving system, for example. Accordingly, after the issue of the instruction for stopping the driving system, it is desired to discharge the remaining charge from the second and third capacitors so that the terminal voltages of the second and third capacitors are kept at a predetermined voltage or lower.

In the sixth disclosure, the step-up converter is configured to perform the step-down action. Accordingly, after the switch unit is turned off by the first discharge control unit, the step-up converter performs the step-down action and controls the second and third inverters so that the first direct-current power source can be charged with the respective discharge power of the second and third capacitors. This makes it possible to achieve effective energy utilization as compared to the configuration in which most part of the electric energy accumulated in the second and third capacitors is converted into thermal energy to lower the terminal voltages of the second and third capacitors.

After that, the second and third inverters are controlled under instruction from the second discharge control unit to further lower the respective terminal voltages of the second and third capacitors. At this time, the terminal voltages of the second and third capacitors are lowered by the first discharge control unit, which makes it possible to reduce the heat generated by the distribution of the discharge current of the second and third capacitors to the second and third inverters.

In a seventh disclosure, the driving system is mounted in a vehicle, and each of the first alternating-current rotary electrical machine and the second alternating-current rotary electrical machine is connected to wheels of the vehicle in such a manner capable of transferring motive power. The seventh disclosure includes: an auxiliary machine that is electrically connected to at least one of the first direct-current power source and a third direct-current power source different from the first direct-current power source and the second direct-current power source; a DCDC converter that lowers the direct-current voltage output from the first direct-current power source and supplies the direct-current voltage to the third direct-current power source; and a regeneration control unit that performs a process of providing an instruction to control the first inverter to cause the first alternating-current rotary electrical machine to generate regenerative power using kinetic energy of the vehicle during running of the vehicle and a process of providing an instruction to control the second inverter to cause the second alternating-current rotary electrical machine to generate regenerative power using the kinetic energy of the vehicle during running of the vehicle.

The seventh disclosure includes the auxiliary machine that is electrically connected to at least one of the first direct-current power source and the third direct-current power source. Accordingly, the auxiliary machine is driven with supply of power from at least one of the first direct-current power source and the third direct-current power source. In the seventh disclosure, the first and second alternating-current rotary electrical machines can generate regenerative power. Accordingly, the generated regenerative power of at least one of the first and second alternating-current rotary electrical machines can be used as driving power for the auxiliary machine. Thus, in the event of an abnormality in the second alternating-current rotary electrical machine, for example, the generated regenerative power of the first alternating-current rotary electrical machine can be used as driving power for the auxiliary machine, unlike in the configuration in which the auxiliary machine is electrically connected to the second direct-current power source. Therefore, even in the event of an abnormality that the generated regenerative power of either of the first and second alternating-current rotary electrical machines cannot be supplied, it is possible to improve the reliability in driving the auxiliary machine, as compared to the configuration in which the auxiliary machine is electrically connected to the second direct-current power source.

In an eighth disclosure, the output voltage of the first direct-current power source is set to be lower than the output voltage of the second direct-current power source, and the auxiliary machine is electrically connected to the third direct-current power source.

The efficiency of power conversion in the DCDC converter tends to be higher with increase in step-down ratio as the ratio of the output voltage to the input voltage of the DCDC converter. In the eighth disclosure, therefore, the output voltage of the first direct-current power source connected to the DCDC converter is set to be lower than the output voltage of the second direct-current power source, and the auxiliary machine is electrically connected to the third direct-current power source that is electrically connected to the first direct-current power source via the DCDC converter. This makes it possible to increase the step-down ratio of the DCDC converter as compared to the configuration in which the auxiliary machine is electrically connected via the DCDC converter to the second direct-current power source, thereby improving the efficiency of power conversion in the DC converter.

In a ninth disclosure, the DCDC converter is a bidirectional DCDC converter that is capable of supplying power from the third direct-current power source to the first direct-current power source, and the second alternating-current rotary electrical machine is a motive power source of the vehicle. The ninth disclosure includes: an abnormality determination unit that determines whether an abnormality has occurred in the second direct-current power source; an abnormality control unit that, when the abnormality determination unit determines that an abnormality has occurred in the second direct-current power source, provides an instruction to control the DCDC converter to charge the first direct-current power source with discharge power of the third direct-current power source or supply the discharge power of the third direct-current power source to the second alternating-current rotary electrical machine; and an evacuation control unit that, when the abnormality determination unit determines that an abnormality has occurred in the second direct-current power source, provides an instruction to control the second inverter to supply power from at least one of the first direct-current power source and the third direct-current power source to the second alternating-current rotary electrical machine to drive the second alternating-current rotary electrical machine.

According to the ninth disclosure, even when the abnormality determination unit determines that an abnormality has occurred in the second direct-current power source, the second inverter is controlled such that the second alternating-current rotary electrical machine is supplied with power from at least one of the first direct-current power source and the third direct-current power source. This makes it possible to drive the second alternating-current rotary electrical machine to evacuate the vehicle.

In a tenth disclosure, the vehicle includes an engine as a motive power source of the vehicle, the DCDC converter is a bidirectional DCDC converter that is capable of supplying power from the third direct-current power source to the first direct-current power source, the first alternating-current rotary electrical machine has a starter function to provide initial rotation of an output shaft of the engine, and the second alternating-current rotary electrical machine is a motive power source of the vehicle. The tenth disclosure includes: an abnormality determination unit that determines whether an abnormality has occurred in the second direct-current power source; an abnormality control unit that, when the abnormality determination unit determines that an abnormality has occurred in the second direct-current power source, provides an instruction to control the DCDC converter to charge the first direct-current power source with discharge power of the third direct-current power source; and an evacuation control unit that, when the abnormality determination unit determines that an abnormality has occurred in the second direct-current power source, provides an instruction to control the first inverter to supply power from the first direct-current power source to the first alternating-current rotary electrical machine so that the first alternating-current rotary electrical machine is driven for power running to provide initial rotation of the output shaft of the engine and performs a control to start combustion of the engine.

According to the tenth disclosure, even when the abnormality determination unit determines that an abnormality has occurred in the second direct-current power source, the first inverter is controlled such that, while the first direct-current power source is charged with the discharge power of the third direct-current power source, the power is supplied from the first direct-current power source to the first alternating-current rotary electrical machine so that the first alternating-current rotary electrical machine is driven to perform power running and provide the initial rotation of the output shaft of the engine, and a control for starting the combustion of the engine is performed. This makes it possible to, in the event of an abnormality in the second direct-current power source, start the engine to evacuate the vehicle.

In an eleventh disclosure, the first direct-current power source is a capacitor. The eleventh disclosure includes a discharge control unit that, when it is determined that a stop instruction signal for the driving system has been input, provides an instruction to control the DCDC converter such that the third direct-current power source is charged with the discharge power of the first direct-current power source.

After the stop of the driving system, if the terminal voltages of the first direct-current power source is high, the user may get an electric shock from the driving system, for example. Accordingly, after the issue of the instruction for stopping the driving system, it is desired to discharge the remaining charge from the first direct-current power source to lower the terminal voltage of the first direct-current power source.

In the eleventh disclosure, when it is determined that the stop instruction signal for the driving system has been input, the DCDC converter is controlled to charge the third direct-current power source with the discharge power of the first direct-current power source. This makes it possible to achieve effective energy utilization as compared to the configuration in which most part of the electric energy accumulated in the first direct-current power source is converted into thermal energy to lower the terminal voltage of the first direct-current power source.

In a twelfth disclosure, the auxiliary machine is electrically connected to the first direct-current power source. The twelfth disclosure includes an output acquisition unit that acquires required output power of the auxiliary machine, the regeneration control unit provides an instruction to control at least one of the second inverter and the third inverter such that the generated regenerative power to be supplied from at least one of the first alternating-current rotary electrical machine and the second alternating-current rotary electrical machine to the first direct-current power source via the step-up converter meets the required output power acquired by the output acquisition unit.

In the twelfth disclosure, the generated regenerative power supplied from at least one of the first and second alternating-current rotary electrical machines to the first direct-current power source via the step-up converter can be set according to the required output power of the auxiliary machine. Accordingly, the power supplied from the first direct-current power source into the auxiliary machine and the generated regenerative power supplied to the first direct-current power source can be made approximately equal. This makes it possible to prevent the occurrence of a voltage drop that is a significant reduction of the terminal voltage of the first direct-current power source along with the driving of the auxiliary machine, and set the terminal voltage of the first direct-current power source to be equal to or greater than a minimum operating voltage of the auxiliary machine. As a result, the auxiliary machine can be stably driven.

In a thirteenth disclosure, the auxiliary machine includes an auxiliary rotary electrical machine as a rotary electrical machine and an auxiliary machine inverter that is operated to convert direct-current power output from the first direct-current power source to alternating-current power and apply the alternating-current power to the auxiliary rotary electrical machine. The thirteenth disclosure includes: an auxiliary machine information acquisition unit that acquires rotation speed and torque of the auxiliary rotary electrical machine; a required voltage calculation unit that calculates an auxiliary machine required voltage as an instructed value of an input voltage from the first direct-current power source to the auxiliary machine inverter based on the rotation speed and torque acquired by the auxiliary machine information acquisition unit; and a processing unit that, to control the terminal voltage of the first direct-current power source to the auxiliary machine required voltage, performs at least one of a first process of changing a step-up ratio as a ratio of a direct-current voltage output from the inverter-side connection unit to a direct-current voltage input from the power source-side connection unit by control of the step-up converter, a second process of changing power transferred between the first inverter and the first alternating-current rotary electrical machine by control of the first inverter, and a third process of changing power transmitted between the second inverter and the second alternating-current rotary electrical machine by control of the second inverter.

The efficiency of the rotary electrical machine as the ratio of the output motive power of the auxiliary rotary electrical machine to the input power into the auxiliary machine electrical machine depends on the rotation speed and torque of the auxiliary rotary electrical machine. Accordingly, setting the appropriate auxiliary machine required voltage according to the rotation speed and torque of the auxiliary rotary electrical machine makes it possible to improve the efficiency of the rotary electrical machine.

Therefore, the thirteenth disclosure includes the processing unit that performs at least one of the first to third processes to control the terminal voltage of the first direct-current power source to the auxiliary machine required voltage calculated by the required voltage calculation unit.

Describing the first process, when the terminal voltage of the first direct-current power source is higher than the auxiliary machine required voltage, for example, the step-up converter is controlled to lower the step-up ratio. When the step-up ratio is lowered, the current flow from the first direct-current power source to the step-up converter increases to lower the terminal voltage of the first direct-current power source toward the auxiliary machine required voltage.

Describing the second process, when the terminal voltage of the first direct-current power source is higher than the auxiliary machine required voltage, for example, the first inverter is controlled to lower the generated regenerative power supplied from the first alternating-current rotary electrical machine to the step-up converter. When the generated regenerative power is lowered, the generated regenerative power supplied to the first direct-current power source via the step-up converter decreases to lower the terminal voltage of the first direct-current power source toward the auxiliary machine required voltage.

Describing the third process, when the terminal voltage of the first direct-current power source is higher than the auxiliary machine required voltage, for example, the second inverter is controlled to increase power consumption of the first alternating-current rotary electrical machine. When the power consumption is increased, the power supplied from the first direct-current power source to the first inverter via the step-up converter increases to lower the terminal voltage of the first direct-current power source toward the auxiliary machine required voltage. In this manner, according to the thirteenth disclosure in which at least one of the first to third processes is performed, it is possible to improve the efficiency of the rotary electrical machine.

The present disclosure has been described so far according to the embodiments, but it is noted that the present disclosure is not limited to the foregoing embodiments or structures. The present disclosure includes various modifications and changes in a scope of equivalents. In addition, various combinations and modes, and other combinations and modes including only one element of the foregoing combinations and modes, less or more than the one element are included in the scope of the present disclosure and in the scope of its idea.

What is claimed is:

1. A driving system with a first alternating-current rotary electrical machine and a second alternating-current rotary electrical machine, comprising:
    a first inverter that is electrically connected to the first alternating-current rotary electrical machine to drive the first alternating-current rotary electrical machine;
    a second inverter that is electrically connected to a first end of both ends of each of phase windings constituting the second alternating-current rotary electrical machine to drive the second alternating-current rotary electrical machine;
    a step-up converter that has a power source-side connection unit electrically connectable to a first direct-current power source and an inverter-side connection unit electrically connected to the first inverter via a first electrical path and electrically connected to the second inverter via a second electrical path, and raises an output voltage of the first direct-current power source and outputs the output voltage to the first inverter and the second inverter; and
    a third inverter that is electrically connected to a second end of the both ends of each of the phase windings constituting the second alternating-current rotary electrical machine, and transfers power to a second direct-current power source different from the first direct-current power source to drive the second alternating-current rotary electrical machine, wherein
    the second direct-current power source and the first alternating-current rotary electrical machine are connected by a single connection route,
    the driving system is mounted in a vehicle,
    each of the first alternating-current rotary electrical machine and the second alternating-current rotary electrical machine is connected to wheels of the vehicle in such a manner capable of transferring motive power, and the driving system comprises:
    an auxiliary machine that is electrically connected to at least one of
    the first direct-current power source and a third direct-current power source different from the first direct-current power source and the second direct-current power source;
    a DCDC converter that lowers the direct-current voltage output from the first direct-current power source and supplies the direct-current voltage to the third direct-current power source; and
    a regeneration control unit that performs a process of providing an instruction to control the first inverter to cause the first alternating-current rotary electrical machine to generate regenerative power using kinetic energy of the vehicle during running of the vehicle and a process of providing an instruction to control the second inverter to cause the second alternating-current rotary electrical machine to generate regenerative power using the kinetic energy of the vehicle during running of the vehicle.

2. The driving system according to claim 1, wherein
the output voltage of the first direct-current power source is set to be lower than the output voltage of the second direct-current power source, and
the auxiliary machine is electrically connected to the third direct-current power source.

3. The driving system according to claim 1, wherein
the DCDC converter is a bidirectional DCDC converter that is capable of supplying power from the third direct-current power source to the first direct-current power source,
the second alternating-current rotary electrical machine is a motive power source of the vehicle, and
the driving system comprises:
an abnormality determination unit that determines whether an abnormality has occurred in the second direct-current power source;
an abnormality control unit that, when the abnormality determination unit determines that an abnormality has occurred in the second direct-current power source, provides an instruction to control the DCDC converter to charge the first direct-current power source with discharge power of the third direct-current power source or supply the discharge power of the third direct-current power source to the second alternating-current rotary electrical machine; and
an evacuation control unit that, when the abnormality determination unit determines that an abnormality has occurred in the second direct-current power source, provides an instruction to control the second inverter to supply power from at least one of the first direct-current power source and the third direct-current power source to the second alternating-current rotary electrical machine to drive the second alternating-current rotary electrical machine.

4. The driving system according to claim 1, wherein
the vehicle includes an engine as a motive power source of the vehicle,
the DCDC converter is a bidirectional DCDC converter that is capable of supplying power from the third direct-current power source to the first direct-current power source,
the first alternating-current rotary electrical machine has a starter function to provide initial rotation of an output shaft of the engine, the second alternating-current rotary electrical machine is a motive power source of the vehicle, and
the driving system comprises:
an abnormality determination unit that determines whether an abnormality has occurred in the second direct-current power source;
an abnormality control unit that, when the abnormality determination unit determines that an abnormality has occurred in the second direct-current power source, provides an instruction to control the DCDC converter to charge the first direct-current power source with discharge power of the third direct-current power source; and
an evacuation control unit that, when the abnormality determination unit determines that an abnormality has occurred in the second direct-current power source, provides an instruction to control the first inverter to supply power from the first direct-current power source to the first alternating-current rotary electrical machine to drive the first alternating-current rotary electrical machine for power running to provide initial rotation of the output shaft of the engine and performs a control to start combustion of the engine.

5. The driving system according to claim 1, wherein
the first direct-current power source is a capacitor, and
the driving system comprises a discharge control unit that, when determining that a stop instruction signal for the driving system has been input, provides an instruction to control the DCDC converter to charge the third direct-current power source with the discharge power of the first direct-current power source.

6. The driving system according to claim 1, wherein
the auxiliary machine is electrically connected to the first direct-current power source,
the driving system comprises an output acquisition unit that acquires required output power of the auxiliary machine, and
the regeneration control unit provides an instruction to control at least one of the second inverter and the third inverter for the required output power acquired by the output acquisition unit to be met to the generated regenerative power to be supplied from at least one of the first alternating-current rotary electrical machine and the second alternating-current rotary electrical machine to the first direct-current power source via the step-up converter.

7. The driving system according to claim 5, wherein
the auxiliary machine includes:
an auxiliary rotary electrical machine as a rotary electrical machine; and
an auxiliary machine inverter that is operated to convert direct-current power output from the first direct-current power source to alternating-current power and apply the alternating-current power to the auxiliary rotary electrical machine, and
the driving system comprises:
an auxiliary machine information acquisition unit that acquires rotation speed and torque of the auxiliary rotary electrical machine;
a required voltage calculation unit that calculates an auxiliary machine required voltage as an instructed value of an input voltage from the first direct-current power source to the auxiliary machine inverter based on the rotation speed and torque acquired by the auxiliary machine information acquisition unit; and
a processing unit that, to control the terminal voltage of the first direct-current power source to the auxiliary machine required voltage, performs at least one of a first process of changing a step-up ratio as a ratio of a direct-current voltage output from the inverter-side connection unit to a direct-current voltage input from the power source-side connection unit by control of the step-up converter, a second process of changing power transferred between the first inverter and the first alternating-current rotary electrical machine by control of the first inverter, and a third process of changing power transferred between the second inverter and the second alternating-current rotary electrical machine by control of the second inverter.

* * * * *